United States Patent
Shimura

(10) Patent No.: US 9,778,748 B2
(45) Date of Patent: Oct. 3, 2017

(54) POSITION-OF-INTEREST DETECTION DEVICE, POSITION-OF-INTEREST DETECTION METHOD, AND POSITION-OF-INTEREST DETECTION PROGRAM

(71) Applicant: SHARP KABUSHIKI KAISHA, Osaka-shi, Osaka (JP)

(72) Inventor: Tomoya Shimura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 12 days.

(21) Appl. No.: 14/404,595

(22) PCT Filed: May 29, 2013

(86) PCT No.: PCT/JP2013/064842
§ 371 (c)(1),
(2) Date: Nov. 28, 2014

(87) PCT Pub. No.: WO2013/180151
PCT Pub. Date: Dec. 5, 2013

(65) Prior Publication Data
US 2015/0145762 A1    May 28, 2015

(30) Foreign Application Priority Data
Jun. 1, 2012   (JP) ................ 2012-126299

(51) Int. Cl.
*G09G 5/00* (2006.01)
*G06F 3/01* (2006.01)
(Continued)

(52) U.S. Cl.
CPC .............. *G06F 3/017* (2013.01); *G06F 3/005* (2013.01); *G06F 3/0304* (2013.01); *G06F 3/0425* (2013.01); *G06K 9/00335* (2013.01)

(58) Field of Classification Search
CPC ........ G06F 3/017; G06F 3/005; G06F 3/0304; G06F 3/0425; G06K 9/00335
(Continued)

(56) References Cited

U.S. PATENT DOCUMENTS

2004/0242988 A1* 12/2004 Niwa .................... A61B 6/467
                                                        600/407
2007/0279485 A1* 12/2007 Ohba .................... G06F 3/012
                                                         348/41
2012/0056989 A1    3/2012 Izumi

FOREIGN PATENT DOCUMENTS

| JP | 2005-216061 A | 8/2005 |
| JP | 2009-87026 A | 4/2009 |

(Continued)

*Primary Examiner* — Mark Regn
(74) *Attorney, Agent, or Firm* — Birch, Stewart, Kolasch & Birch, LLP

(57) ABSTRACT

A distance calculation unit acquires a first position information indicating a position of a part of a body of each user indicated in an image captured by an imaging device. A user information analysis unit detects an operation region where a user can operate by using a part of a body, based on the first position information, and that identifies as an operator candidate a user having the part of the body indicated by the first position information in case that the detection of the operation region was possible. The user information analysis unit, of operator candidates, identifies as an operator a user including a part of the body in the operation region, and identifies as a user who cannot perform operation a user other than a user identified as the operator of the operator candidates. Because of the above, it is possible to increase operability.

17 Claims, 17 Drawing Sheets

(51) Int. Cl.
  *G06F 3/042* (2006.01)
  *G06F 3/00* (2006.01)
  *G06K 9/00* (2006.01)
  *G06F 3/03* (2006.01)

(58) Field of Classification Search
  USPC .......................................................... 345/156
  See application file for complete search history.

(56) References Cited

FOREIGN PATENT DOCUMENTS

| | | |
|---|---|---|
| JP | 2011-2292 A | 1/2011 |
| JP | 2011-175617 A | 9/2011 |

\* cited by examiner

POSITION-OF-INTEREST DETECTION DEVICE, POSITION-OF-INTEREST DETECTION METHOD, AND POSITION-OF-INTEREST DETECTION PROGRAM

TECHNICAL FIELD

The present invention relates to a position-of-interest detection device, a position-of-interest detection method, and a position-of-interest detection program.

BACKGROUND ART

Various device and methods have been proposed as user interfaces for operating equipment such as computers and game machines. In game machines in particular, ones that detect user movement (by motion capturing) and operate the equipment with the overall body attitude of the user have been proposed.

For example, in the three-dimensional fingertip position detection apparatus described in Patent Reference 1, first and second cameras capture the image of the fingertip of an operator and detect the three-dimensional position of the captured fingertip.

The image display apparatus described in Patent Reference 2 recognizes a user, detects the position and movement of the user and, from the detected user position and movement, discriminate a user that is viewing the displayed image, and controls an application that displays an image corresponding to the user.

PRIOR ART LITERATURES

Patent Literatures

[Patent Literature 1] Japanese Unexamined Patent Application, First Publication No. 2011-02292

[Patent Literature 2] Japanese Unexamined Patent Application, First Publication No. 2009-87026

SUMMARY OF INVENTION

Problem to be Solved by the Invention

However, with the three-dimensional fingertip position detection apparatus described in Patent Literature 1, in order to detect the position on the display that is pointed to by the direction of the fingertip, it is essential that the user directs the fingertip at the position-of-interest, and the degree of freedom of the gestures for specifying a position-of-interest to the user may be low. Also, if the finger pointing direction is parallel to the optical axis of the camera, it might not be easy to detect the position and attitude of the finger.

Additionally, with the three-dimensional fingertip position detection apparatus described in Patent Literature 1, because the finger pointing position direction and the gaze direction of the user are not necessarily parallel, it might not be possible to move a pointer on the display in accordance with the position-of-interest to the user, and operation might require practice.

With the image display apparatus described in Patent Literature 2, when the user moves, it might not be possible to distinguish whether the movement was the intended movement for the input of an operation or a movement having a different intention. If a plurality of users are simultaneously viewing an image displayed on the image display apparatus, a movement by one user might result in the input of an operation not intended by another users. If a plurality of users move simultaneously and the image display apparatus accepts each of the input operations, faulty operation might occur by instructions to perform contradictory processing with respect to the input operations, and this can hinder viewing of the image.

With an increase in the display size and an increase in resolution, if many thumbnails, icons, or the like are displayed at one time, it is necessary with conventional remote control to press cursor operating buttons any number of times until reaching the desired contents, making operation difficult. In a conventional gesture user interface, because it was not possible to know the positional relationship between the pointer operation starting point and the hand, it was not possible to grasp the pointer operation starting point on the screen, thereby creating the problem of it not being possible to make operation according to the intention of the operator.

The present invention has been made with the above-noted problems in mind and provides a position-of-interest detection device capable of improving ease of operation.

Means to Solve the Problem

The present invention is made to solve the above described problem, an aspect of the present invention is a position-of-interest detection device including: a first position detection unit that acquires a first position information indicating a position of a part of a body of each user indicated in an image captured by an imaging device; and a user information analysis unit that detects an operation region where a user can operate by using a part of a body, based on the first position information, and that identifies as an operator candidate a user having the part of the body indicated by the first position information in case that the detection of the operation region was possible, wherein the user information analysis unit, of operator candidates, identifies as an operator a user including a part of the body in the operation region, and identifies as a user who cannot perform operation a user other than a user identified as the operator of the operator candidates.

In addition, an aspect of the present invention is the above described position-of-interest detection device, wherein, in case that the part of the body is included in the operation region, the user information analysis unit detects user information that includes information indicating a shape of a part of the body of the user identified in the image captured by the imaging device, including a control unit that executes processing corresponding user information detected by the user information analysis unit.

In addition, an aspect of the present invention is the above described position-of-interest detection device, wherein the user information analysis unit detects the operation region by a prescribed operation specified by the user.

In addition, an aspect of the present invention is the above described position-of-interest detection device, wherein the user information analysis unit, by the user specifying a first vertex in a display region of a display device within the field of view of the user and making an operation of specifying a second vertex diagonally opposite the first vertex, detects the operation region.

In addition, an aspect of the present invention is the above described position-of-interest detection device including a position-of-interest detection unit that associates a size of an operation region detected by the user information analysis unit in case that the user is viewed from the display device with a size of an operated region in the display region of a display device and that calculates, based on the association, a corresponding position within an operated region from the position of a part of the body of the user within the operation region.

In addition, an aspect of the present invention is the above described position-of-interest detection device, wherein the part of the body is a hand.

In addition, an aspect of the present invention is the above described position-of-interest detection device including a display unit that displays an image captured by the imaging device, wherein the imaging device is installed at a position higher than that of the display unit.

In addition, an aspect of the present invention is the above described position-of-interest detection device, wherein the operation region broadens from the operator toward the position-of-interest detection device.

In addition, an aspect of the present invention is the above described position-of-interest detection device, wherein the user information analysis unit, based on a position of an eye or a face of the operator and the operated region in the display region of the display device, detects the operation region.

In addition, an aspect of the present invention is the above described position-of-interest detection device including a position-of-interest detection unit that calculates a position indicated by a part of a body of the operator that is a position within an operated region in the display region of a display device, based on reference position information representing a position of an eye or a position of a face of the operator and instruction position information indicating a position of the part of the body of the operator.

In addition, an aspect of the present invention is a position-of-interest detection method in a position-of-interest detection device, including: a first position detection step of acquiring a first position information indicating a position of a part of a body of each user indicated in an image captured by an imaging device; and a user information analysis step of detecting an operation region where a user can operate by using a part of a body, based on the first position information, and of identifying as an operator a user having the part of the body indicated by the first position information in case that the detection of the operation region was possible.

In addition, an aspect of the present invention is a position-of-interest detection method in a position-of-interest detection device, including: a first position detection step of acquiring a first position information indicating a position of a part of a body of each user indicated in an image captured by an imaging device; a user information analysis step of detecting an operation region where a user can operate by using a part of a body, based on the first position information, and of identifying as an operator a user having the part of the body indicated by the first position information in case that the detection of the operation region was possible; and a point-of-interest detection step of associating a size of an operation region detected by the user information analysis step in case that the user is viewed from a display device with a size of an operated region in the display region of a display device, and of calculating, based on the association, a corresponding position within an operated region from the position of a part of a body of the user within the operation region.

In addition, an aspect of the present invention is a position-of-interest detection method in a point-of-interest detection program for execution by a computer of: a first position detection means that acquires a first position information indicating a position of a part of a body of each user indicated in an image captured by an imaging device; and a user information analysis means that detects an operation region where a user can operate by using a part of a body, based on the first position information, and that identifies as an operator a user having the part of the body indicated by the first position information in case that the detection of the operation region was possible.

In addition, an aspect of the present invention is a position-of-interest detection method in a point-of-interest detection program for execution by a computer of: a first position detection means that acquires a first position information indicating a position of a part of a body of each user indicated in an image captured by an imaging device; a user information analysis means that detects an operation region where a user can operate by using a part of a body, based on the first position information, and that identifies as an operator a user having the part of the body indicated by the first position information in case that the detection of the operation region was possible; and a point-of-interest detection means that associates a size of an operation region detected by the user information analysis means in case that the user is viewed from the display device with a size of an operated region in the display region of a display device and that calculates, based on the association, a corresponding position within an operated region from the position of a part of a body of the user within the operation region.

Effect of the Invention

The present invention improves the ease of operation.

EMBODIMENTS FOR CARRYING OUT THE INVENTION

First Embodiment

Embodiments of the present invention will be described below, with references made to the drawings.

Figure 1:
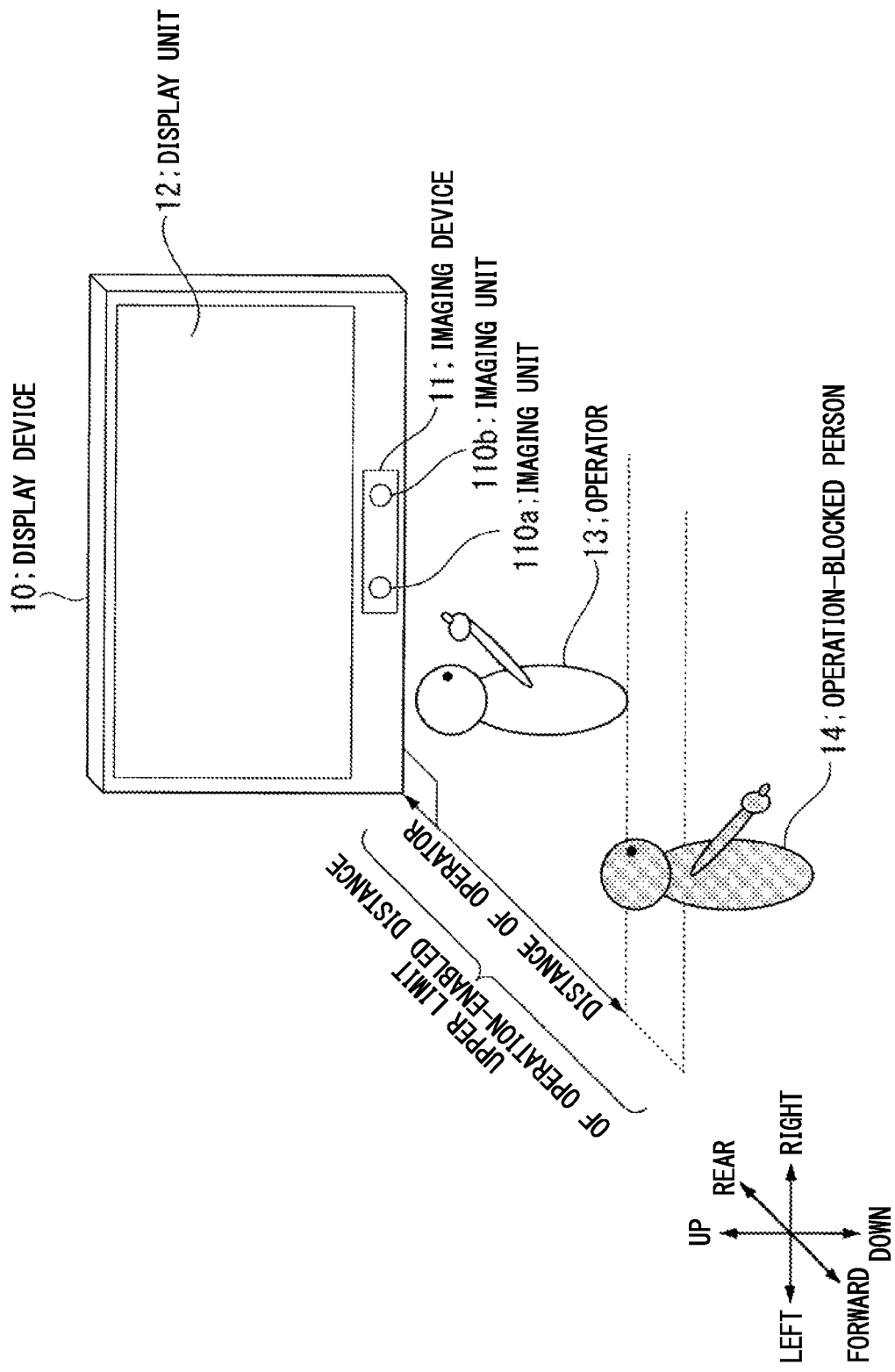
FIG. 1 is a conceptual drawing showing how a display device according to an embodiment of the present invention is used.

FIG. 1 is a conceptual drawing showing how a display device 10 according to the present embodiment is used.

In FIG. 1, a display device 10 is a device that displays an image, such as a TV receiver, a digital signage (electronic sign) device, or a video conferencing device. The display device 10 has an imaging device 11 in the center part at the lower edge of the front thereof and has a display unit 12 so as to cover the greater portion of the front of the display device 10.

The imaging device 11 is, for example, a stereo camera that captures an image toward the front therefrom. The imaging device 11 has, for example, imaging units 110a and 110b, which capture images, at positions mutually distanced from one another in the left-right directions. The imaging units 110a and 110b are each camera units. The display unit 12 is, for example, a display that displays an image. The display device 10 also has a speaker (not shown) that outputs sound.

An operator 13 is a user who operates the display device 10. The operator 13 faces the front of the display device 10 and assumes a prescribed attitude, such as motion of the hands or body (gesture). A user information analysis unit 201 (FIG. 3) built into the display device 10 acquires user information that represents the attitude of a part of body of the operator 13 represented by the image captured by the imaging device 11. The user information includes, for example, information representing the shape of a pointed finger or the like or a first and the method of movement thereof. The display device 10 executes processing (functions and operations) corresponding to the user information acquired via the imaging device 11, thereby enabling the operator 13 to evoke processing in the display device 10 by the shape of a pointed finger or the like or a first and the method of movement thereof.

The display device 10 has set therein a pre-established operation-enabled region, over which operation by an operator 13 will be accepted, using the position of the display device 10 itself as the reference. As the operation-enable region, the display device 10 has set therein, for example, an upper limit (for example 3 meters) of the operation-enabled distance from the center part of the display device 10 to the hand of the operator 13 in the direction toward the front. However, the left-to-right direction of the operation-enable region can be set to be within the field of view angle of the imaging device 11, in which case the left-to-right direction setting is unnecessary. The display device 10 does not accept an operation from an operation-blocked person 14, who is an operation-disabled person at a distance that exceeds the upper limit of the operation-enable region. The processing to distinguish users from whom operations are accepted will be described later in detail.

Figure 2:
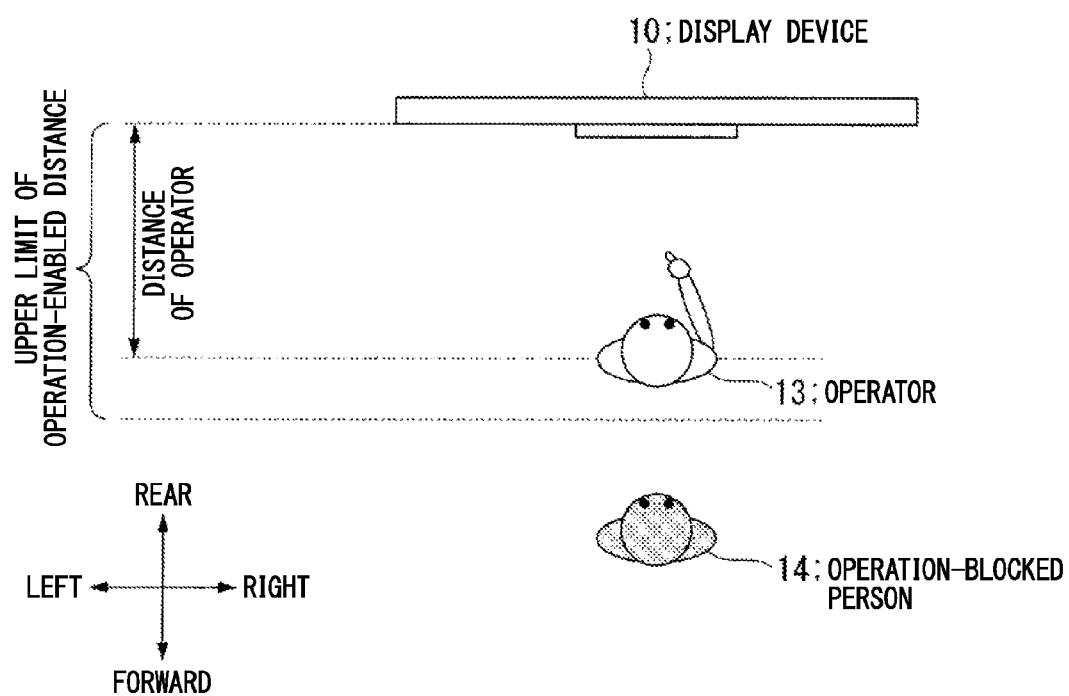
FIG. 2 is a plan view showing the positional relationship between users and the display device.

FIG. 2 is a plan view showing the positional relationship between users and the display device 10.

In FIG. 2, the up and down directions represent the direction to the rear and the direction forward of the display device 10, respectively. This applies also to the positional relationships between the operator 13, the operation-blocked person 14, and the display device 10. In this case, in FIG. 2, the operator 13 is in front of the display device 10 and is located at a position that is shorter (closer) than the upper limit of the operation-enabled distance from the display device 10. In contrast, the operation-blocked person 14 is in front of the display device 10 and is located at a position that is greater (more distant) than the upper limit of the operation-enabled distance from the display device 10.

As described above, by the operation-enabled distance (upper limit of the operation-enabled distance) being set, the control unit 22 (FIG. 3) limits the opportunities for a plurality of users to make operations simultaneously and the opportunities for an image to be input that represents an operation other than the intended operation or for an operation to be misinterpreted (for example, hand motions of a passerby in the case of digital roadside signage). For example, it is possible to avoid processing not intended by a viewer of an image even if a plurality of users are using the display device 10 simultaneously, such as in digital signage installed in public locations.

Although in the example shown in FIG. 1, the imaging device 11 is installed at the lower edge of the front of the display device 10, this is not a restriction. For example, the imaging device 11 may be installed at the upper edge of the front of the display device 10, or may be installed at a position distanced from the display device 10.

The imaging device 11 may be installed at position that is higher than the face and, in particular, higher than the eye level of the operator 13. For this reason, the height of the imaging device 11 is pre-established with consideration given to the height of the floor surface where the operator 13 is located and the average human height. In addition, if the display device 10 is installed in a relatively low position, such as on the floor, the imaging device 11 may be installed at a position that is higher than the display unit 12.

This enables the imaging device 11 to capture an image representing the body of the operator 13 from a position that is higher than the face of the operator 13, and enables preventing of the blocking of the face of the operator 13 by the shape of a pointed finger or the like or a first and the method of movement thereof. For this reason, the control unit 22 can, using the facial image of the operator 13, perform stable processing, such as distinguishing the operator and detecting the position of the face thereof, and detect operations. This processing will be described later.

(Constitution of the Display Device)

Next, the constitution of the display device 10 according to the embodiment will be described.

Figure 3:
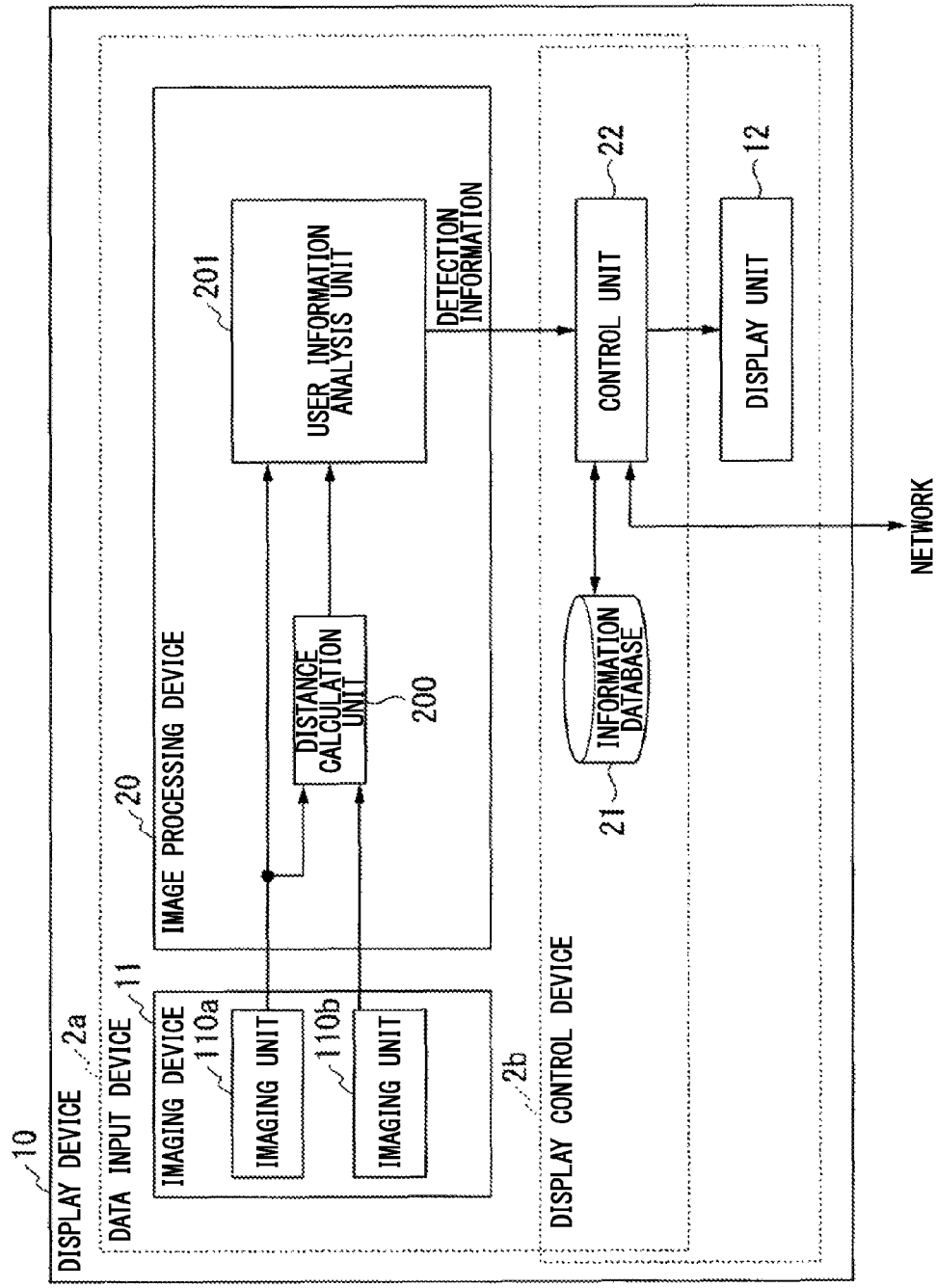
FIG. 3 is a block diagram showing the constitution of a display device according to the above embodiment.

FIG. 3 is a block diagram showing the constitution of the display device 10 according to the present embodiment.

The display device 10 is constituted to include a data input device 2a and a display control device 2b. The data input device 2a is constituted to include the imaging device 11, the image processing device 20, the information database 21, and the control unit 22.

The imaging device 11 generates an image signal representing a captured image, and outputs the generated image signal to the image processing device 20. The image processing device 20 acquires operator information representing the operator distinguished based on the image signal input from the imaging device 11, acquires first spatial information representing a position in which a part of the body of the operator is located, and acquires user information representing the shape of a part of the body of the operator. The image processing device 20 outputs the acquired operator information, first spatial information, and user information as detection information to the display control device 2b.

The display control device 2b is constituted to include the information database 21, the control unit 22, and the display unit 12.

The information database 21 has stored therein display information to be displayed in accordance with operation input based on an image signal representing an image of the operator 13. The display information is, for example, an image signal representing, for example image contents, text information representing news and the like, contents information representing contents received from a network, or a guidance image signal representing a guidance (operating guide) image. The details of the guidance image will be later.

The control unit 22 extracts the first spatial information and the user information from the detection information input from the image processing device 20. If the position of the operator 13 represented by the extracted first spatial information is within the pre-established operation-enabled region, the control unit 22 performs processing corresponding to the extracted user information. In this case, for example, the control unit 22 judges whether or not the distance of the operator 13 indicated by the first spatial information is smaller than the upper limit of the operation-enabled distance set beforehand. Processing corresponding to the user information is, for example, processing related to various image displays, such as display of a guidance screen, display of image contents, information retrieval from a network, storage of image contents or news related to retrieved information, display of stored information.

The control unit 22 stores the information indicated by an instruction for storage into the information database 21 as display information. The control unit 22 reads out from the information database 21 display information indicated by an instruction for display and outputs an image signal representing the read-out display information to the display unit 12. The control unit 22 stops output of the display information for which a stop instruction has been given.

The display unit 12 displays the image signal input from the control unit 22 as an image, thereby displaying image contents or news-related image selected by an operation by an operator 13, or displaying a guidance image.

By doing this, the display control device 2b executes processing to select contents represented by user information included in the detected information input from the image processing device 20 and processing to display the selected contents.

Next, the detailed constitution of the data input device 2a will be described.

The imaging device 11 is constituted to include the imaging units 110a and 110b. The imaging units 110a and 110b generate image signals representing the captured images, and output the generated image signals to the image processing device 20. The imaging unit 110a outputs the generated image signal to the user information analysis unit 201. The imaging units 110a and 110b, for example, are cameras having an optical system with a lens that collects light incident from a subject and an imaging device that converts the collected light to an electrical signal. The imaging devices of the imaging units 110a and 110b are, for example, CCDs (charge-coupled devices), or CMOS (complementary metal oxide semiconductor) devices.

The image processing device 20 is constituted to include the distance calculation unit 200 and the user information analysis unit 201.

Various image signals are input to the distance calculation unit 200 from the imaging unit 110a and 110b. The distance calculation unit 200 calculates distance information indicating the distance from the imaging device 11 to a subject (for example, the operator 13), based on each of the input image signals, using, for example, the stereo matching method.

(Distance Information Calculation)

At this point, the method of calculating distance information using block matching, which is a type of stereo matching, will be described. In stereo matching, the parallax value of the images captured by the imaging units 110a and 110b is calculated as the distance value. In the description that follows, an image at a certain point in time that is included in the image captured by the imaging unit 110a will be called the left image. The image at that point in time that is included in the image captured by the imaging unit 110b will be called the right image.

In stereo matching, a search is made for a right-image block of the region corresponding to a left-image block that is a partial region in the left image. The description will use the example of the left image and a right image captured simultaneously therewith.

Figure 4:
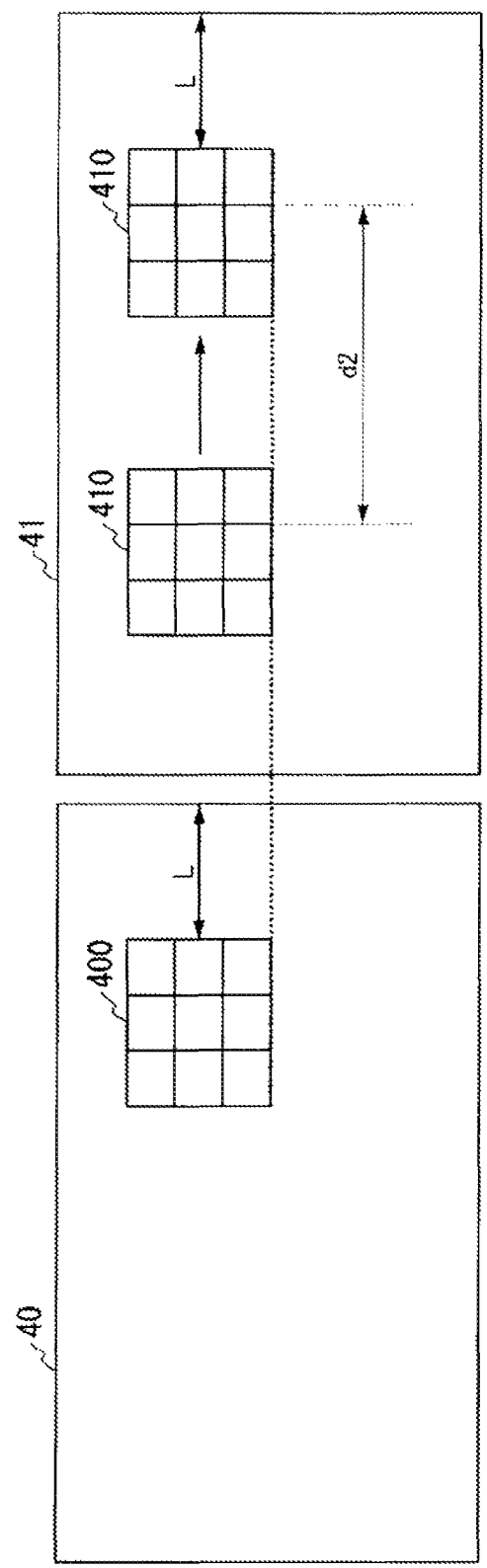
FIG. 4 is a conceptual drawing showing an example of a left screen and a right screen.

FIG. 4 is a conceptual drawing showing an example of left and right images, in which the left image 40 is shown on the left side and the right image 41 is shown on the right side.

The distance calculation unit 200 sets a left-image block (window) 400 with the pixel-of-interest at its center in the left image 40. The total of nine squares (three in the left-to-right direction and three in the top-to-bottom direction) included in the left-image block 40 each represent a pixel. In FIG. 4, the distance in the horizontal direction from the right edge of the left image 40 to the right edge of the left-image block 400 is L pixels (the distance of L pixels), where L is an integer of 1 or larger.

The distance calculation unit 200 sets in the right image 41 a right-image block 410 having the same top-to-bottom coordinate as the left-image block 400 and having a right edge at a distance L+d2 from the right edge of the right image 41 as the initial value. In this relationship, d2 is a pre-established integer value representing the maximum parallax value. The size and shape of the right-image block 410 are the same as of the left-image block 400.

The distance calculation unit 200 calculates an index value between the left-image block 400 and the right-image block 410. The distance calculation unit 200 shifts the position until the right edge of the right-image block 410 distance from the right edge of the right image 41 is L pixels, and measures the index values at each of the shifted positions. The distance calculation unit 200, based on the calculated index values, sets the right-image block 410 at the position that corresponds to the left-image block 400. If the SAD (sum of absolute difference) value is, for example, used as the index value, the right-image block 410 having the minimum SAD value is set. This position is the point-of-interest corresponding to the pixel-of-interest in the left image 40. The absolute value of the difference in coordinates in the horizontal direction between the point-of-interest and the pixel-of-interest is the parallax. The distance calculation unit 200 executes this for each pixel included in the left image 40 and generates, as the distance information, parallax information (also known as a parallax map or a disparity map) indicating the parallax values for each pixel included in the image captured by the imaging unit 110a. The parallax is larger, the shorter is the distance from the imaging device 11 to the subject, and is smaller, the longer is the distance. The distance calculation unit 200 outputs the generated distance information to the user information analysis unit 201.

The parallax map is a bit map image converted to a gray scale, having, for each pixel, a parallax value expressed by an integer value represented by a prescribed number of bits (for example, for eight bits the minimum value of 0 to the maximum value of 255). The distance calculation unit 200 may, based on camera parameters, such as the baseline length, which is the distance between the imaging unit 110a and the imaging unit 110b, convert to the distance in the subject space from the imaging device 11 to the subject and generate distance information indicating the converted distance. In this case, the distance calculation unit 200 may perform generation, using as the distance information in place of the distance information indicating the parallax value for each pixel, a bit map image (depth map) that has been converted to a gray scale.

The imaging units 110a and 110b may be disposed at different coordinate values in the top-to-bottom direction, and the parallax may be calculated using captured images that indicate the images captured by each thereof. In this case, the distance calculation unit 200, using an image block in the image captured by either of the imaging units 110a and 110b as a reference, can shift the image block in the image captured by the other upward and downward to search for the corresponding image block.

The distance calculation unit 200 uses, for example, Equation (1) when calculating the SAD value.

Equation (1)

$$SAD = \sum_{i=0}^{8} (|X_i - X_{ai}|) \quad (1)$$

In Equation (1), $X_i$ is the pixel value for, for example, each green (G) pixel included in the left-image block 400. The total number 9 (which is the number when the i of the $X_i$ changes from 0 to 8) is an example of the number of pixels included in one image block. The disposition of pixels corresponding to each of the pixel values $X_0$ to $X_8$ is arranged from the left edge to the right edge in each row and from the top to bottom from the uppermost row to the lowermost row like an image block 400a shown at the left side of FIG. 5. The value $X_{ai}$ is the pixel value for each pixel included in the right-image block 410. The disposition of pixels corresponding to each of the pixel values $X_{a0}$ to $X_{a8}$ is arranged from the left edge to the right edge in each row and from the top to bottom from the uppermost row to the lowermost row like an image block 410a shown in the right side of FIG. 5.

The index value is not restricted to being the SAD value. As long as it represents the correlation between pixel values included in the left-image block 400 and pixel values included in the right-image block 410, a different index value, such as the SSD (sum of squared differences) value or the DP (dynamic programming) value may be used.

The window size, which is the size of the left-image block 400 and the right-image block 410, is not restricted to being three pixels in the horizontal direction and three pixels in the top-to-bottom direction as described above. For example, it may be larger than noted above, such as five pixels in the horizontal direction and five pixels in the top-to-bottom direction or nine pixels in the horizontal direction and nine pixels in the top-to-bottom direction, and it may have center coordinates that are offset from the point-of-interest, such as with four pixels in the horizontal direction and four pixels in the top-to-bottom direction. The direction of shifting the right-image block 410 is not restricted to shifting from the left side to the right side, and may be from the right side to the left side. The pixels included in the left-image block 400 and the right-image block 410 are not restricted to being the signal value of the green (G) pixel as described above, and may be the signal value for a different color, for example red (R) pixel, and may also be a signal value of a pixel based on a different color system or an arbitrary combination thereof.

In the above-described block matching method, the coordinates of the left image 40 and the corresponding coordinates of the right image 41 are offset in the left-to-right direction and not offset in the top-to-bottom direction, and the epipolar lines of the left image 40 and the right image 41 were assumed to coincide. The disposition of the imaging units 110a and 110b in which the optical axes thereof are parallel is done so that the epipolar lines (also called auxiliary lines) coincide. In order to make the epipolar lines coincide, coordinate transformation of the captured image signals may be performed so that the optical axes of the left image 40 and the right image 41 are parallel, based on the camera parameters of the imaging units 110a and 110b, which are acquired by the distance calculation unit 200 beforehand. The processing to perform coordinate transformation is called rectification or deviation correction. After performing this processing, the distance calculation unit 200 generates distance information.

Figures 5, 6:
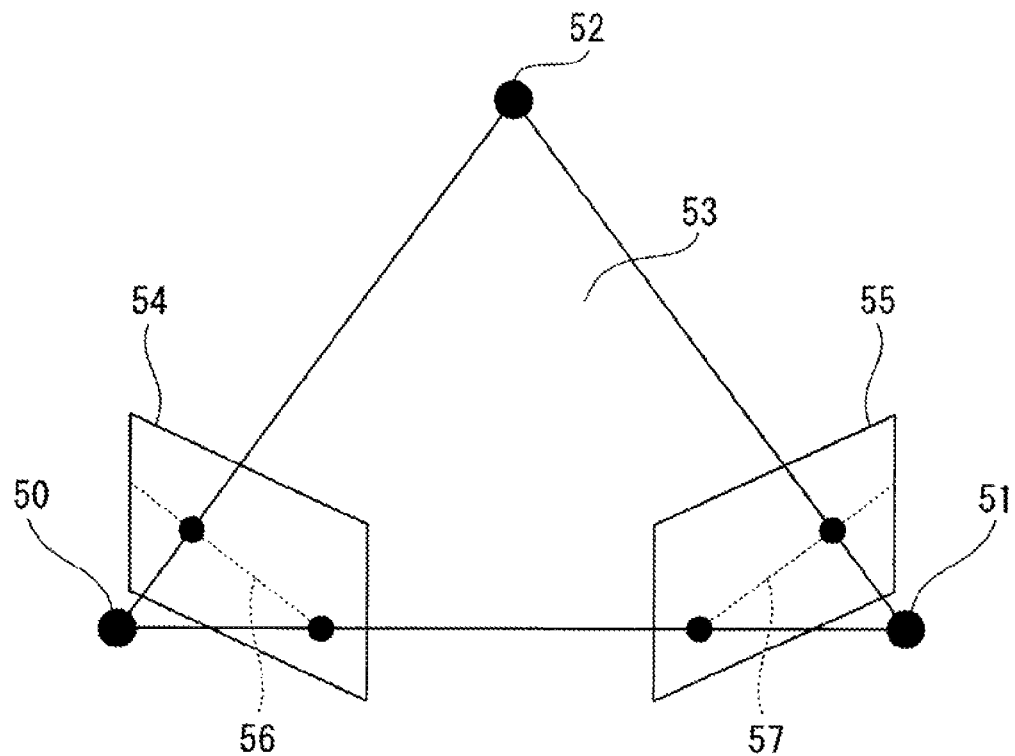
FIG. 5 is a conceptual drawing showing an example of image blocks.
FIG. 6 is a conceptual drawing showing the positional relationship on the imaging plane.

The epipolar lines, as shown in FIG. 6, are the lines of intersection 56 and 57 between the epipolar plane 53 and the imaging planes 54 and 55 of the two imaging units 110a and 110b. The epipolar plane 53 is the plane passing through the three points, which are the focal points 50 and 51 of the lenses of the two imaging units 110a and 110b and a characteristics point 52 in the subject space.

If the imaging units 110a and 110b are disposed so that their optical axes are parallel, the epipolar lines 56 and 57 are horizontal lines with the same top-to-bottom direction coordinates in the left image 40 and the right image 41.

(User Information Analysis)

Next, the constitution of the user information analysis unit 201 according to the present embodiment will be described.

Figure 7:
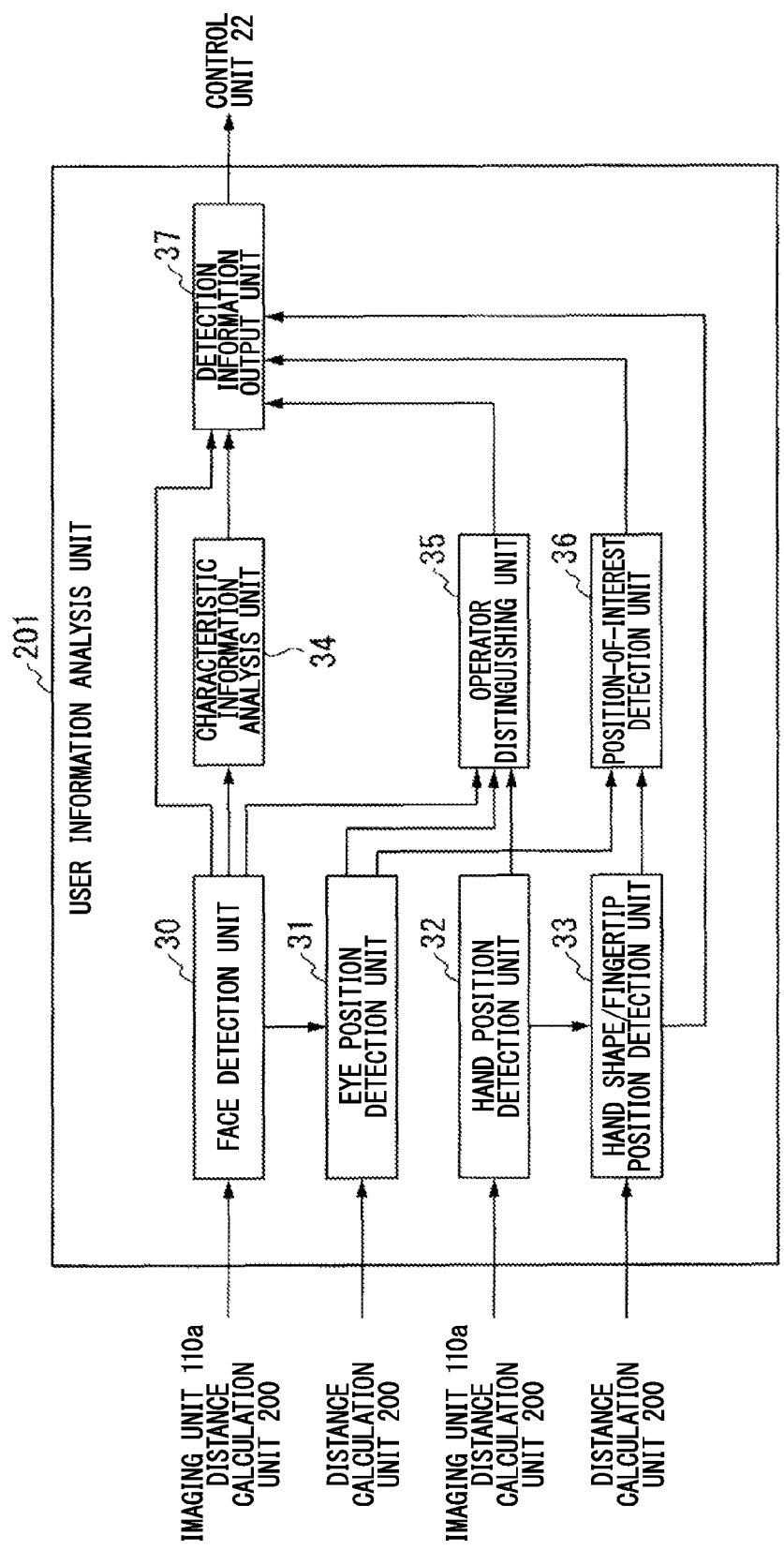
FIG. 7 is a simplified drawing showing the constitution of a user information analysis unit according to the above embodiment.

FIG. 7 is a simplified drawing showing the constitution of the user information analysis unit 201 according to the present embodiment.

The user information analysis unit 201 has a face detection unit 30, an eye position detection unit 31, a hand position detection unit 32, a hand shape/fingertip position detection unit 33, a characteristic information analysis section 34, an operator distinguishing unit 35, a position-of-interest detection unit 36, and a detection information output unit 37.

(User Face Detection)

The face detection unit 30, based on the image signal input from the imaging unit 110a, detects the region representing the image of the face of the operator (also called the face region). The face detection unit 30 generates two-dimensional face region information, which indicates the two-dimensional coordinates of a typical point (for example, the point at the center of gravity) in the detected face region or the two-dimensional coordinates of the upper, lower, left, and right edges of that region. From the distance information input form the distance calculation unit 200, the face detection unit 30 extracts the distance value regarding the pixels in two dimensions representing the two-dimensional face region information. The face detection unit 30 transforms the distance values corresponding to the above-described two-dimensional coordinates to three-dimensional coordinates in the subject space, and generates three-dimensional face position information.

To detect the face region, the face detection unit 30, for example, extracts a pixel in a range of color signal values that represents a pre-established facial coloration (for example, complexion) from the input image signal.

The face detection unit 30 may also have a storage unit which stores beforehand a gradation (monochrome) signal representing a human face. In this case, the face detection unit 30 calculates for each image block having a plurality of pixels the correlation values between the gradation image signal read out from the storage unit and the input image signal and detects the image block as the face region if the calculated correlation value is greater than a pre-established threshold.

Additionally, the face detection unit 30 may calculate a feature (for example, a Haar-Like feature) based on the input image signal, and detect the face region by performing pre-established processing (for example, the Adaboost algorithm) based on the calculated feature. The method used by the face detection unit 30 to detect the face region is not restricted to the methods described above, and may be any method, as long as it is enables detection of the face region from the input image signal.

The face detection unit 30 outputs a face image signal representing the detected face image to the characteristic information analysis unit 34 and the eye position detection unit 31. The face detection unit 30 outputs the generated three-dimensional face position information and the two-dimensional face region information to the operator distinguishing unit 35. The face detection unit 30 outputs the generated three-dimensional face position information as a part of the detection information to the detection information output unit 37.

(Eye Position Detection)

The eye position detection unit 31 detects the eye regions from an image of the face represented by the face image signal input from the face detection unit 30. The eye position detection unit 31 calculates the two-dimensional eye position coordinates, which are representative points (for example, points of the center of gravity) of the detected eye regions. The eye position detection unit 31 extracts the distance values of pixels located in the detected eye position coordinates from the distance information input from the distance calculation unit 200. The eye position detection unit 31 transforms the pair of the calculated two-dimensional eye position coordinates and the extracted distance values to three-dimensional eye position coordinates in the subject space and generates three-dimensional eye position information. The eye position detection unit 31 outputs the three-dimensional eye position information representing the calculated three-dimensional eye position coordinates to the position-of-interest detection unit 36 and the operator distinguishing unit 35. The eye position detection unit 31 outputs an eye region signal representing the image of the detected eye region and the two-dimensional eye position information representing the calculated two-dimensional eye position coordinates to the operator distinguishing unit 35.

In order to detect the eye region, the eye position detection unit 31 has, for example, a storage unit into which pre-captured eye template image has been stored. The eye position detection unit 31 may read out the eye template image from the storage unit and perform template matching to check between the read-out template image and the input face image signal. The eye position detection unit 31 may, of the face region represented by the input face image signal, use the eye position information that indicates the eye positional relationship to an already set face (for example, the already measured face region and the positions of both eyes) to detect the eye positions. The eye position detection unit 31 may calculate a feature (for example, a Haar-Like feature) based on the input face image signal and detect the eye positions by performing pre-established distinguishing processing (for example, the Adaboost algorithm) based on the calculated feature.

The method used by the eye position detection unit 31 to detect the eye region is not restricted to those described above, and any method can be used, as long as it is a method for detecting the eye region from the face image signal.

The eye position detection unit 31 may output as the detected eye region the left eye or right eye position or an eye region signal that represents all of these, regardless of center of gravity of the two eyes.

(Hand Position Detection)

The hand position detection unit 32 detects a region representing an image of an operator's hand that is represented by an image signal input from the imaging unit 110*a* and calculates the detected hand position.

In order to detect the region representing the image of the hand, the hand position detection unit 32, for example, extracts a pixel in a range of color signal values that represents a pre-established hand surface coloration (for example, complexion) from the input image signal. The hand position detection unit 32 calculates as the hand position the two-dimensional coordinate values of a representative point (for example, the center of gravity) of the region representing the detected image of the hand. The hand position detection unit 32 extracts the distance value corresponding to the calculated coordinate values from the distance information input from the distance calculation unit 200, transforms the set of distance values corresponding to the calculated two-dimensional coordinate values to three-dimensional coordinates in the subject space, and generates three-dimensional hand position information. The hand position detection unit 32 outputs a hand image signal representing the detected hand region image and hand position information representing the calculated two-dimensional coordinate values of the representative point to the hand shape/fingertip position detection unit 33. The hand position detection unit 32 outputs the hand position information to the operator distinguishing unit 35.

In order to detect the region representing the hand image, the hand position detection unit 32 may, based on the distance information input from the distance calculation unit 200, extract an image within a distance range represented by pre-established starting and ending points in the depth direction, which is referenced to a three-dimensional face position represented by three-dimensional face position information input from the face detection unit 30, as a region representing an image of the hand from the image signal input from the imaging unit 110*a*. The pre-established distance range is, for example, forward (toward the display device 10 side) from the three-dimensional face position. This enables preventing of the recognition of the hand another person either in front of or behind the operator rather than the hand of the operator.

(Hand Shape/Fingertip Position Detection)

The hand shape/fingertip position detection unit 33 detects the hand shape based on a hand image signal and hand position information input from the hand position detection unit 21.

In order to detect the hand shape, the hand shape/fingertip position detection unit 33 detects the contour part of the hand by performing, for example, edge extraction processing from the hand image signal. The hand shape/fingertip position detection unit 33 searches the extracted contour part for protruding parts having a radius of curvature within a pre-established range (for example, 6 to 12 mm) as the finger region image. In this search, the hand shape/fingertip position detection unit 33 judges whether or not the above-noted protruding part exists within the searching region of a prescribed radius from a representative point indicated by the hand position information, and updates the searching region concentrically by successively changing the radius. The hand shape/fingertip position detection unit 33 counts the number of fingers, based on the detected finger region.

The hand shape/fingertip position detection unit 33 detects the vertices of the detected protruding parts as the two-dimensional coordinates of the fingertip positions of each finger. The hand shape/fingertip detection unit 33 extracts from the distance information input from the distance calculation unit 200 the distance value of a pixel located on two-dimensional coordinates at the prescribed fingertip. The hand shape/fingertip position detection unit 33 generates three-dimensional fingertip position information that represents a set of extracted distance values and the two-dimensional coordinates of the fingertip as the three-dimensional coordinates in the subject space. The hand shape/fingertip position detection unit 33 outputs the generated three-dimensional fingertip position information to the position-of-interest detection unit 36. The hand shape/fingertip position detection unit 33 outputs as a part of the detection information to the detection information output unit 37 a finger image signal representing the detected finger region, count information representing the number of fingers, and the two-dimensional finger position information representing the two-dimensional coordinates of the fingertip.

(Characteristic Information Analysis)

The characteristic information analysis unit 34 generates characteristic information representing the attributes of a user (for example, age, gender, expression), based on the face image signal input from the face detection unit 30. Characteristic information indicating age (age information) is not limited to actual age, and may be information representing pre-established age ranges (for example, teens, 20s, young child, older minors and young adults, older adults, and elderly). Characteristic information indicating gender (gender information) as male or female. Characteristic information indicating expression (expression information) is, for example, information indicating whether or not the subject is smiling, and may include degree of smiling information indicating to what level a person is smiling.

In order to generate age information or gender information, the characteristic information analysis unit 34 has a storage unit which stores, for example, a face image signal indicating an image of the face of a person whose age is known and of a person whose gender is known. The characteristic information analysis unit 34 calculates index values between an image of a detected face region and a face image signal read out from the storage unit and determines the age information or gender information, based on the calculated index values. For example, a method may be used whereby the degree of similarity is calculated as the index value, and the age information or gender information resulting in the maximum degree of similarity is determined. In addition, a method may be used whereby Gabor features are calculated as index values and the age information or gender information is determined using an SVM (support vector machine).

In order to generate the expression information, the characteristic information analysis unit 34 has a storage unit into which are stored beforehand, for example, contour information of each constituent part of the image information representing the image of a person laughing (for example, eyes and mouth), and position information representing the position of the constituent parts. The characteristic information analysis unit 34 generates the contour information for the constituent parts and the position information for each constituent part, from the detected image of the face region, and compares these, respectively, with the contour information and position information read out from the storage unit.

Doing this, the characteristic information analysis unit 34 estimates the characteristic information representing the age, gender, and expression. The method of estimating the characteristic information is not restricted to that described above, and may be any method that estimates the age, the gender, and the expression from image information representing a face.

The characteristic information analysis unit 34 outputs the generated characteristic information to the detection information output unit 37 as a part of the detection information.

(Distinguishing an Operator)

Next, a method for distinguishing an operator will be described.

The operator distinguishing unit 35, based on the three-dimensional face position information input from the face detection unit 30, distinguishes as an operator a user existing in a region that is within a pre-established operation-enabled distance from among users whose face regions have been detected (refer to FIG. 1 and FIG. 2). The operator distinguishing unit 35, for example, distinguishes as an operator a user whose face exists at a distance from the imaging device 11 shorter than an upper limit of the operation-enabled distance that is pre-established by the distance indicated by the three-dimensional face position information. This distinguishes the operator from among users whose faces have been detected by the face detection unit 30. In contrast, the operator distinguishing unit 35 distinguishes a user existing outside the pre-established operation-enabled distance as an operation-disabled person.

The operator distinguishing unit 35 judges whether or not a part of the body (for example, the hand) of a user existing in the operation-enabled region exists in the operation start detection range. The operation start detection range is an established region included in the operation-enabled region that is narrower than the operation-enabled region. The operator distinguishing unit 35 determines the operation start detection range based on the two-dimensional face position information input from the face detection unit 30 and the two-dimensional eye position information input from the eye position detection unit 31. This not only detects that an operation has been started by an operator, but also avoids simultaneously accepting operations from a plurality of persons, and enables accepting an operation from only one operator.

Next, an example of the operation start detection range will be described.

Figure 8:
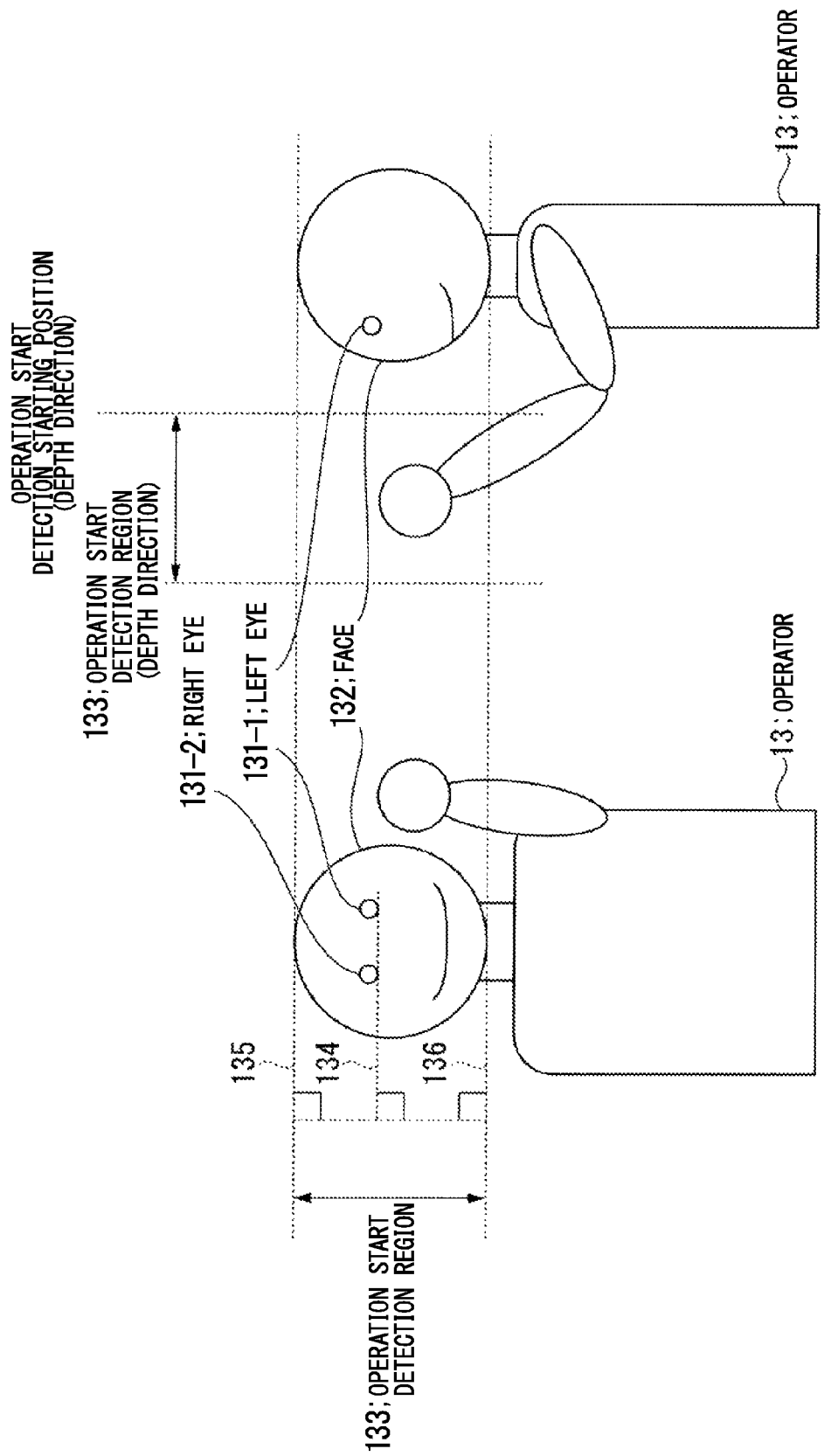
FIG. 8 is a conceptual drawing showing an example of the operation start detection range.

FIG. 8 is a conceptual drawing showing an example of the operation start detection range.

FIG. 8 shows a front view of the operator 13 on the left side thereof and a left side view of the operator 13 on the right side thereof. The operation start detection region 133, for example, includes a line segment 134 that joins the left eye 131-1 and the right-eye 131-2, which are included in the image of the operator 13 represented by the image signal input from the imaging device 11, and that indicates the height of the eyes. That is, this is the region sandwiched between the line segment 135, which is parallel to the line segment 134 and is tangent to the upper edge of the face 132, and the line segment 136, which is parallel to the line segment 134 and is tangent to the lower edge of the face 132. In this case, the operator distinguishing unit 35, based on the two-dimensional face region information input from the face detection unit 30 and the two-dimensional eye position information input from the eye position detection unit 31, calculates the operation start detection region 133.

Returning to FIG. 7, if a representative point indicated by the hand position information input from the hand position detection unit 32 is within the range of the operation start detection region 133 (operation start detection range), the operator distinguishing unit 35 judges that the user whose face exists in the operation start detection region 133 and whose hand exists at that representative point is the operator 13. In this case, the operator distinguishing unit 35, based on the detection information regarding that operator, outputs an operation start signal indicating that an operation has started to the detection information output unit 37. That is, by establishing the operation start detection region 133 in this manner, the operator distinguishing unit 35 judges that a user who has moved the hand at the same height as the face is the operator 13.

If a representative point indicated by the hand position information input from the hand position detection unit 32 is removed to outside from the operation start detection region, the operator distinguishing unit 35 judges that the operator 13 who had caused the hand to exist at the representative point has ended an operation. In this case, the operator distinguishing unit 35 outputs an operation end signal indicating that an operation has ended to the detection information output unit 37 based on the detection information for the operator. That is, from the time at which the operator distinguishing unit 35 outputs an operation start signal to the detection information output unit 37 regarding an operator 13 until the time at which it outputs an operation end signal, the display device 10 accepts input of operations based on the shape of the hand of the user which was judged to be an operator 13. With regard to other users, even if the representative point indicated by the hand position information is within the operation start detection range, the display device 10 does not accept operations from other users during that period of time.

If the existence or non-existence of another user existing in the operation-enabled region is verified and the judgment is that there is another user, the operator distinguishing unit 35 judges, as described above, whether or not the other user judged to exist is an operator 13. If there are a plurality of other users, the operator distinguishing unit 35 determines the one user for which the representative point indicated by the hand position information is closest to the center of the operation start detection region 133 to be the operator 13. Doing this, the display device 10 accepts input of operations from only the one new operator 13 and does not accept input of operations from two users simultaneously.

In FIG. 8, the operator assumes a vertical attitude (for example, standing) with respect to the base surface. However, the operator is not restricted to assuming such an attitude and, for example, might be reclining on the base surface. In such a case, the operator distinguishing unit 35 determines the operation start detection range as described above and makes a judgment regarding the operator 13, thereby enabling stable judgment without dependence on the attitude of the operator and avoiding faulty detection. This will be described next.

Figure 9:
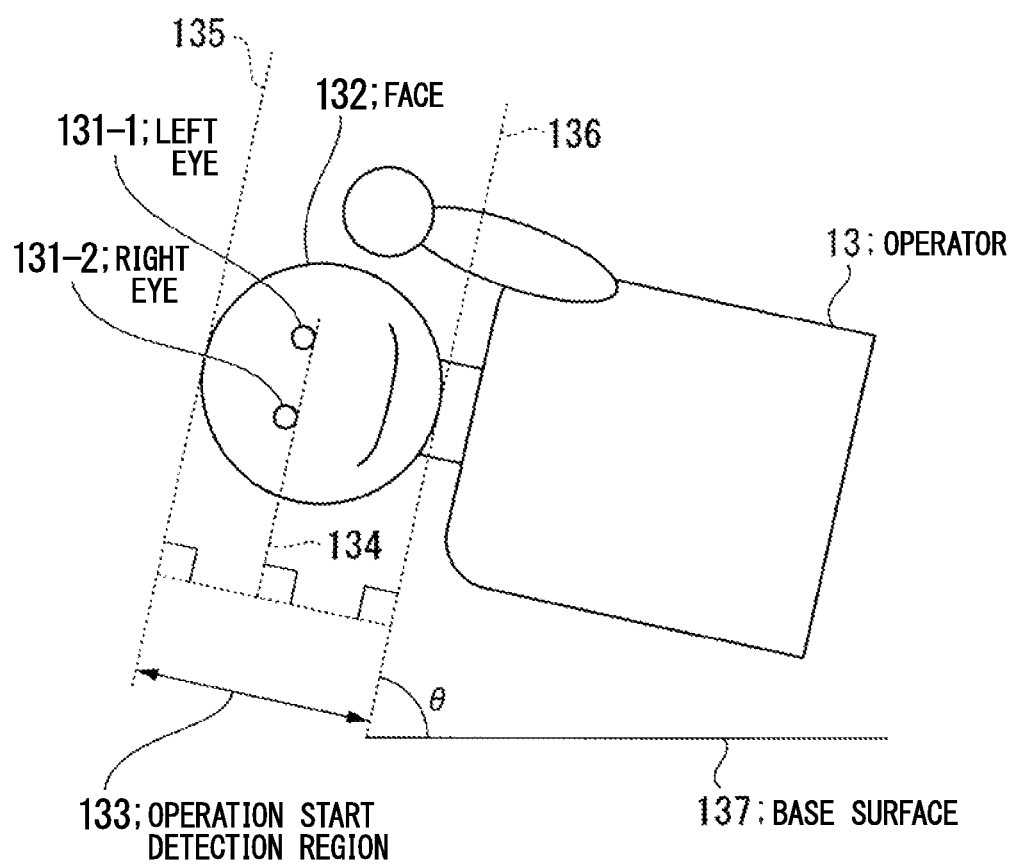
FIG. 9 is a conceptual drawing showing another example of the operation start detection range.

FIG. 9 is a conceptual drawing showing another example of the operation start detection range.

In the example of FIG. 9, the operator 13 is reclining on a base surface 137. In this condition, the angle θ between the line segment 134 joining the left eye 131-1 and the right eye 131-2 and the base surface 137 is an angle that is closer to 90° than 0° (for example, 20°).

In this case, the operator distinguishing unit 35, based on two-dimensional eye position information input from the eye position detection unit 31, determines the line segment 134 joining the left eye 131-1 and the right eye 131-2. The operator distinguishing unit 35, based on the two-dimensional face region information input from the face detection unit 30, determines the line segment 135 that is parallel to the line segment 134 and tangent to the upper edge of the face and the line segment 136 that is parallel to the line segment 134 and tangent to the lower edge of the face. The operator distinguishing unit 35 determines the operation start detection region 133 as the region sandwiched between the line segment 135 and the line segment 136. In this manner, the operator distinguishing unit 35 determines the range of the operation start detection region 133 (operation start detection range) based on the position of the face, which is a part of the body of the operator 13, and distinguishes the operator for acceptance of operations based on the positional relationship with respect to the hand, which is another part of the body related to operation input.

Although the above description has been for an example in which the operator distinguishing unit 35 determines the operation start detection range based on two-dimensional eye position information and two-dimensional face region information, the present embodiment is not restricted to this. The operator distinguishing unit 35 may determine the operation start detection range based on three-dimensional eye position information and three-dimensional face region information, indicating the three-dimensional coordinates in the subject space. In this case, the operator distinguishing unit 35 may distinguish whether or not an operator is an operator from whom operation is to be accepted, in accordance with whether or not the position of the hand in the subject space represented by the three-dimensional hand position information is also included in the operation start detection range in the depth direction (the operation start detection region (in the depth direction) starting from the operation start detection starting position (in the depth direction)). This enables avoidance of faulty detection, by considering the relationship between the operation start detection range and the hand position and also the coordinates in the depth direction.

(Position-of-Interest Detection)

The position-of-interest detection unit 36 detects the position-of-interest, which is a position noted by an operator, based on three-dimensional eye position information input from the eye position detection unit 31 and three-dimensional fingertip position information input from the hand shape/fingertip position detection unit 33 (position-of-interest detection).

The position-of-interest detection performed by the position-of-interest detection unit 36 will be described below, using FIG. 10 to FIG. 12.

Figure 10:
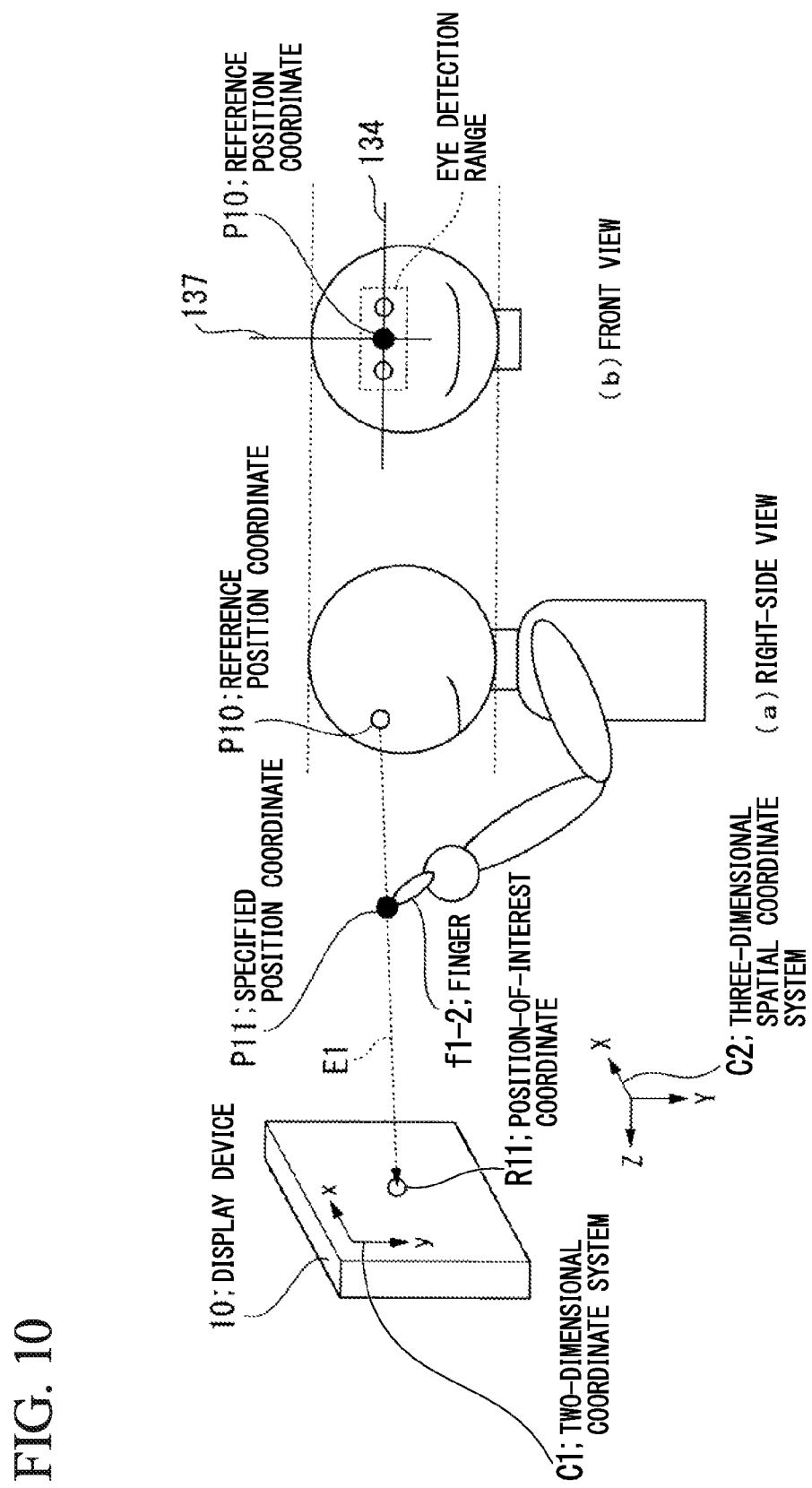
FIG. 10 is a conceptual drawing showing an example of position-of-interest detection.

FIG. 10 is a conceptual drawing showing an example of position-of-interest detection. In FIG. 10 the coordinate system C1 is a two-dimensional coordinate system C1 of coordinates on the display surface of the display device 10. The coordinate system C2 is a three-dimensional coordinate system C2. Three-dimensional face position information, three-dimensional eye position information, three-dimensional hand position information, and three-dimensional fingertip position information are, for example, expressed in the three-dimensional coordinate system C2. In the three-dimensional coordinate system C2, the X-axis direction is the left-right direction in FIG. 1, the Y-axis direction is the up-down direction in FIG. 1, and the Z-axis direction is the forward-rear direction in FIG. 1. In FIG. 10(a) is a right-side view of an operator from the right side, and FIG. 10(b) is a front view of an operator from the front.

The position-of-interest detection unit 36, for example, calculates the reference position coordinates P10, based on the eye position represented by the three-dimensional eye position information. The reference position coordinate P10, as shown in the front view of FIG. 10(b), is the center position between eyes within the eye detection range. Specifically, the position-of-interest detection unit 36 calculates as the reference position coordinate P10 the center point position between the right eye and the left eye represented by the three-dimensional eye position information. The position-of-interest detection unit 36 takes the fingertip position represented by the three-dimensional fingertip position information to be a specified position coordinate P11.

The position-of-interest detection unit 36 calculates point of intersection between the straight line E1 joining the reference position coordinate P10 and the specified position coordinate P11 and the display device 10 as the position-of-interest coordinate R11. The position-of-interest detection unit 36 transforms the calculated position-of-interest coordinate R11 (three-dimensional coordinate system C2) to coordinates in the two-dimensional coordinate system C1 with respect to the image displayed by the display device 10, and generates position-of-interest information representing the transformed position-of-interest coordinate R11. That is, the position-of-interest detection unit 36, based on the reference position coordinate P10 representing the eye position of an operator (or, this may be the face position for example, the position of the center of the face)) and the specified position coordinate P11 representing the position of a part of the body (finger) of the operator, calculates the position-of-interest coordinate R11 indicated by a part of the body of the operator, which is a position within the operating panel P1 (operated region; refer to FIG. 11) of the display region of the display device 10. The position-of-interest detection unit 36 outputs the generated position-of-interest information as a part of the detection information to the detection information output unit 37.

In this manner, the display device 10 identifies, at the center of operator eye position (reference position coordinate P10), the contents at the destination of the operator moving the finger (specified position coordinate P11) as contents that the operator is targeting. This enables the display device 10 to select the contents intended by the operator.

Figure 11:
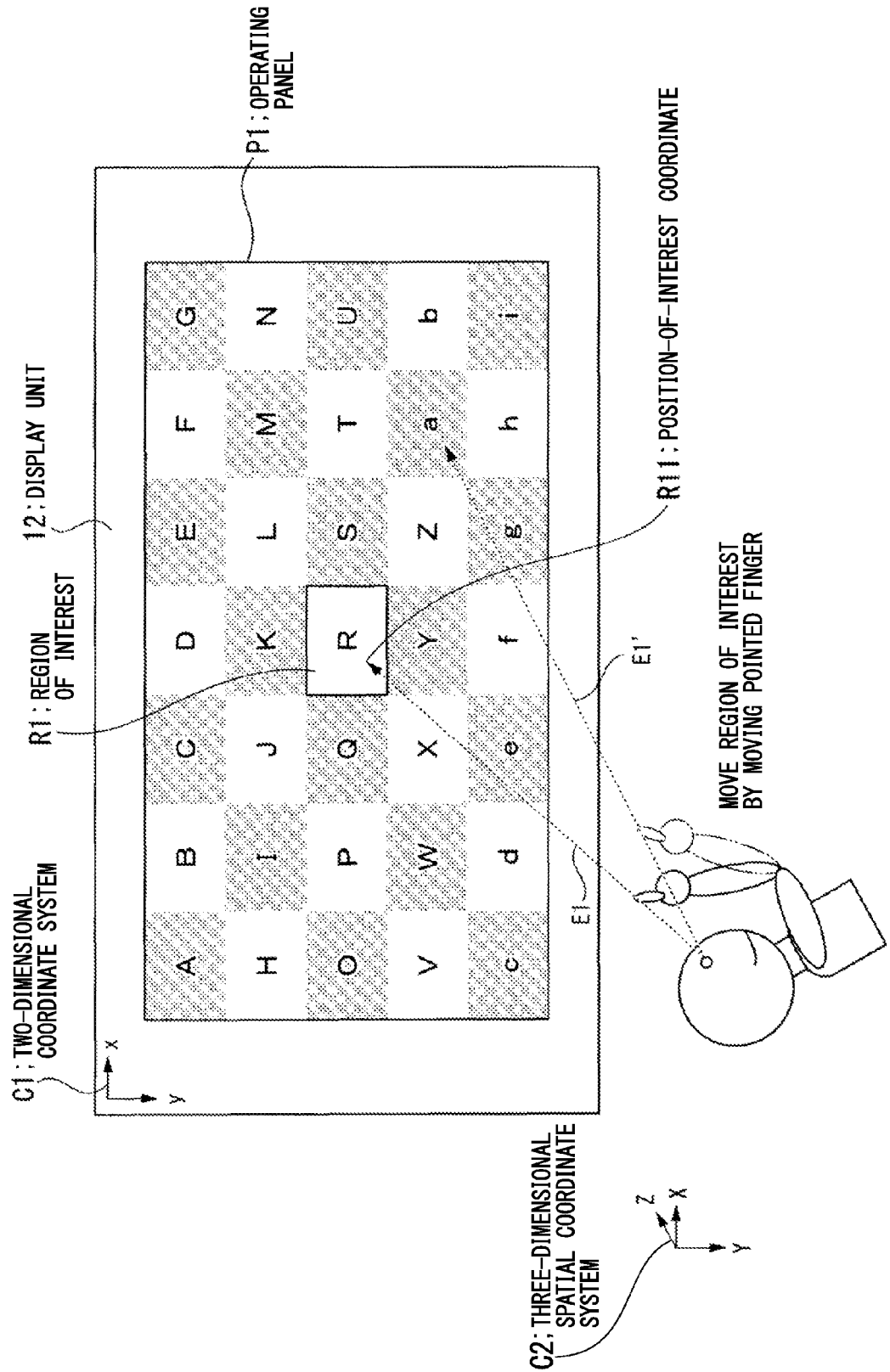
FIG. 11 is a conceptual drawing showing an example of contents selection.

FIG. 11 is a conceptual drawing showing an example of contents selection. In this drawing, the two-dimensional coordinate system C1 and the three-dimensional coordinate system C2 are the same as in FIG. 10. This drawing shows an example indicating selection of contents by an operator, using position-of-interest detection information.

The display unit 12 displays the operating panel P1. The operating panel P1 is, for example, divided into regions, which display images (thumbnails) representing still pictures, videos, and the like and images (icons and the like) representing programs in a computer. In FIG. 11, the operating panel P1 displays contents in each of the regions, these being indicated with letters A to Z and a to i (which will be called contents A to Z and a to i). That is, the operating panel P1 is a listing of registered or recorded contents.

An operator can select and decide desired contents from this contents list and playback or execute the contents. In FIG. 11 the position-of-interest coordinate R11 is in a region in which the contents R is displayed, and this region will be called the region of interest R1. As one example, this drawing shows the operator the representative image for the contents R surrounded by solid lines and shows a highlighted display of the position-of-interest. By this type of display, the display device 10 shows that an operator is interested in the contents R and that the contents R has been selected.

In this manner, the display device 10 detects the position-of-interest of an operator and displays that position on the operating panel P1. This enables the operator to instantly select the desired contents. For example, in the display device 10, it is possible to avoid selection of the incorrect contents if the first (starting) position of an operation by an operator is unknown, and possible to avoid an operation of making a large movement of a hand and a pointing input device (such as a mouse) to search for the current position in order to know the operation starting position.

The above has been a description of the case in which the display device 10 makes a highlighted display of the representative image in order to indicate to the operator the position-of-interest of the operator. The present invention is, however, not restricted to this, and the display device 10 may indicate the position-of-interest or region of interest to the operator by making a pointer display of the position-of-interest by the operator in units of pixels on the display device 12. Also, the display device 10 may detect the shape of the hand indicating the position-of-interest by the operator as the shape of an open hand, the shape of a hand with the index finger extended, or the shape of a closed hand, and detect the specified position coordinate P11 based on the detection result.

FIG. 11 shows that the position-of-interest coordinate R11 changes when the operator moves the finger (specified position coordinate P11). For example, when the straight line joining the reference position coordinate P10 and the specified position coordinate P11 becomes the straight line E1' (single-dot-dashed line), the contents a is selected. In this manner, the operator can move the position pointed to by the finger so as to move the position-of-interest coordinate R11 and so as to change the region of interest R1.

The reference position coordinate P10 is not restricted to the above examples, and the position-of-interest detection unit 36 may take the position of the left eye or the position of the right eye as the reference position coordinate P10. For example, the position-of-interest detection unit 36 stores information indicating the dominant eye of the operator beforehand and, based on that information, takes the position of the dominant eye as the reference position coordinate P10. In this case, the position-of-interest detection unit 36 may, based on a gesture notifying of the dominant eye (closing or winking of one eye, or shaking of the head), judge the dominant eye of the operator, and store information indicating the dominant eye of the operator. In this manner, the display device 10 can, by judging the dominant eye, reduce the error in the position-of-interest coordinate R11. The position-of-interest detection unit 36 may also, based on information indicating the dominant eye of the operator, make a point on the line segment joining the right eye and the left eye to be the reference position coordinate P10. In this case, for example, the position-of-interest detection unit 36 may, for example, make the ratio between the dominant eye and the non-dominant eye to be 7:3, making 0.7×(dominant eye position)+0.3×(non-dominant eye position) to be the reference position coordinate P10. The position-of-interest detection unit 36 may also, for example, when judging that the operator has closed one eye, take the position of the open eye as the reference position coordinate P10.

Figure 12:
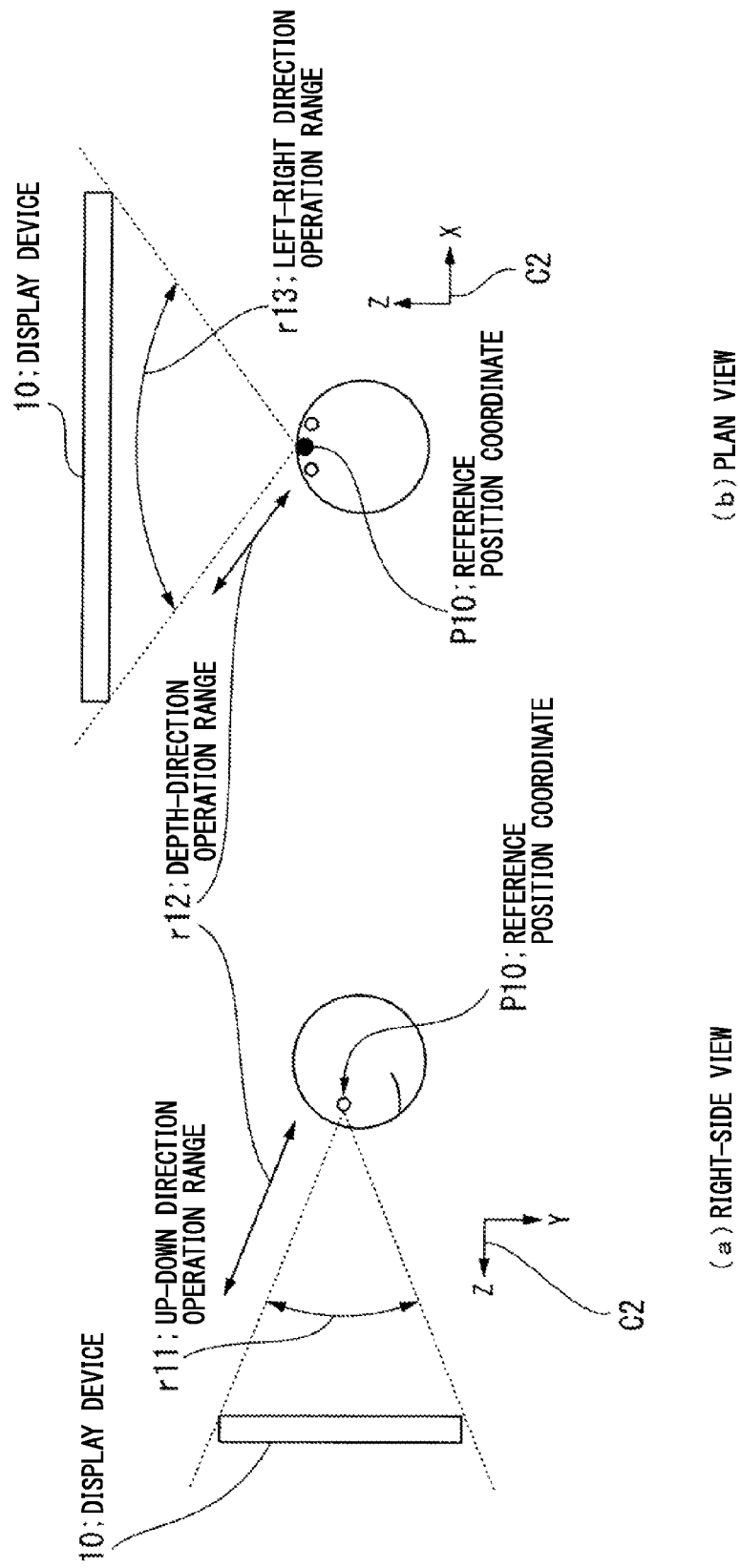
FIG. 12 is a conceptual drawing showing the operation range r1 that is position-of-interest to be detected.

FIG. 12 is a conceptual drawing showing the operation range r1 (operating region) in which position-of-interest detection is done. In this drawing, the three-dimensional coordinate system C2 is the same as in FIG. 10. FIG. 12(*a*) is a right-side view of an operator from the right side and FIG. 12(*b*) is a plan view of an operator from the top.

In FIG. 12(*a*), the up-down direction operation range r11 indicates the operation range from the operator toward the display device 10 in the up-down direction. This up-down direction operation range r11 is the range of the line of view of the operator from the top edge to the bottom edge of the display device 10 about the center that is the reference position coordinate P10.

In FIG. 12(*b*), the left-right direction operation range r13 indicates the operation range from the operator toward the display device 10 in the left-right direction. This left-right direction operation range r11 is the range of the line of view of the operator from the left edge to the right edge of the display device 10 about the center that is the reference position coordinate P10.

In FIG. 12(*a*) and FIG. 12(*b*), the depth-direction operation range r12 indicates the operation range from the operator toward the display device 10 in the depth direction. This depth-direction operation range r12 is a pre-established range of distance from the reference position coordinate P10. The pre-established range of distance is, for example, established with the total length of a person's arm (from the shoulder to the fingertip) as a reference, for example, 80 cm. However, the present invention is not restricted to this, and the display device 10 may change the depth-direction operation range r12 based on gender or height.

The up-down direction operation range r11, the depth-direction operation range r12, and the left-right direction operation range r13 are also referred to as the operation range r1. This operation range r1 broadens from the operator toward the display device 10 (position-of-interest detection apparatus). The operation range r1 is the same as the operation start detection range, but may be different therefrom.

If a specified location coordinate P11 shown in FIG. 12(*a*) and FIG. 12(*b*) exists within the operation range r1, the display device 10 detects the position-of-interest of the operator. That is, the display device 10 detects the operation range r1, based on the eye position or the face position of the operator and the display device 10.

By taking the viewing angle on the display device 10 as seen from the operator as the operation range r1, the display device 10 can detect the destination of the line of view of the operator as the position-of-interest. If the specified position coordinate P11 is outside the operation range r1, the display device 10 deletes the display of the position-of-interest and displays the position-of-interest at the screen edge from which it goes beyond. In this case, the display device 10 displays information, and operation, or an animation indicating that the position is outside the operation range r1 may be provided to inform the operating that the operation range r1 has been missed. In the operation panel P1 in which the range is pre-established, the display device 10 may take the range of the line of view of the operator from the top edge to the bottom edge and from the left edge to the right edge of the operating panel P1 as the operating range r1.

Returning to FIG. 7, the detection information output unit 37 has input thereto the detection information from the face detection unit 30, the characteristic information analysis unit 34, and the operator distinguishing unit 35. If an operation start signal is input from the operator distinguishing unit 35, the detection information output unit 37 outputs to the control unit 22 detection information of the operator related to the input operation start signal. If an operation end signal is input from the operator distinguishing unit 35, the detection information output unit 37 ends the output of the detection information of the operator related to the input operation end signal.

Regardless of the above-described methods and characteristic quantities, the user information analysis unit 201 may, based on an input image signal, detect information related to a user characteristic or an operation instructed by a user.

(Operation by Hand-Shape Recognition)

The control unit 22 extracts from the detection information input from the detection information output unit 37 three-dimensional face position information, a finger image signal, number of fingers information, two-dimensional fingertip position information, position-of-interest information, and characteristic information. The control unit 22 has a storage unit which stores beforehand hand shape information associated with each type of processing that is operated. In this case, the hand shape information indicates the shape of the hand. The control unit 22 reads hand shape information out from the storage unit and compares the read-out hand shape information with the input hand shape information. The control unit 22 executes the processing corresponding to the hand shape information for which the comparison succeeded.

The hand shape information is constituted to include, of the extracted information, a finger image signal, the number of fingers information, and the two-dimensional fingertip position. The hand shape information may indicate the temporary shape or shape of a stationary hand, that is, the attitude thereof, and may indicate the shape of the hand that changes with the elapse of time, that is, movement. For example, if the input hand shape information indicates the shape of both hands with all fingers in a first and the hands being moved up and down in this condition, the control unit 22 reads out program table information from the information database 21 and outputs the read-out program table information to the display unit 12.

The hand shape information may, for example, indicate the shape in which only one finger is in the extended condition. The hand shape information may indicate the shape in which an extended finger is extended straightward or the shape in which the extended finger is bent at the second joint.

The hand shape is not restricted to those described above and may be a shape as an instruction that identifies the type of processing by the display device 10. For example, the hand shape information may indicate the number of extended fingers, the direction of the hand, or the shape in which the tips of the thumb and index finger have been brought into contact. The control unit 22 is not restricted to using the hand shape of the operator, and may use the shape of the body or a part thereof.

(Guidance Image Display)

A plurality of types of guidance image signals may be stored into the information database 21 beforehand, associated with corresponding pre-established distance regions, and the control unit 22 may read out a guidance image signal corresponding to a distance region that includes the distance indicated by extracted three-dimensional distance information. The control unit 22 outputs the read-out guidance image signal to the display unit 12, and the display unit 12 displays the guidance image indicated by the guidance image signal input from the control unit 22. For example, the longer is the region of the distance of the operator 13 from the display device 10, the smaller is made the number of types of processing included, and the more the screen area (number of pixels) representing the operations for each processing is increased, in one guidance image stored in the information database 21. Additionally, a guidance image signal in which the type of processing is represented by enlarged characters may be stored. This enables the operator 13 to clearly grasp the details of displayed operations, even if the distance from the display unit 12 becomes long.

A plurality of types of guidance image signals may be associated with characteristic information and stored into the information database 21, the control unit 22 reading out the guidance image signal corresponding to extracted characteristic information and outputting the read-out guidance image signal to the display unit 12. For example, the higher is the age group of the operator 13, the smaller is made the number of types of processing included, and the more the screen area (number of pixels) representing the operations for each processing is increased, in one guidance image stored in the information database 21. Additionally the characters indicating the type of processing may be enlarged, the older is the age group of the operator 13 compared to other age groups, in the stored guidance image signal. Doing this enables an older operator 13 to clearly grasp the details of operations. Additionally, a guidance image signal in which the volume adjustment step width has been increased with respect to that of other age groups may be stored into the information database 21, and the control unit 22 may perform processing related to the volume adjustment based on that step width. This enables an operator 13 who is older than other age groups a convenient increase in the adjusted volume.

For example, if the gender of the operator 13 is female, a guidance image signal indicating a background of a warm color, such as red or pink, or a guidance image signal indicating an animation character may be stored. In this manner, it is possible to operate the display device 10 in a familiar manner, even if the operator 13 is a female.

Also, with respect to the age group of an operator 13 who is a small child (for example, 10 years old or younger), a guidance image signal in which the characters of the processing rendered in hiragana (Japanese cursive syllabary), or a guidance image signal indicating an animation character may be stored. In this manner, it is possible to grasp the displayed detail of operation and to operate the display device 10 in a familiar manner, even if the operator 13 is a young child.

Also, with respect to the age group of an operator 13 who is a small child or an elderly person (60 or older), a guidance image signal indicating the details of processing a dynamic image may be stored. In this manner, it is possible for even a young child or elderly person to grasp the display device intuitively, by viewing the animation that displays the operating method.

The control unit 22 avoids faulty operation by not detecting very small unintended changes of shape of the hand of the operator 13. To do this, if the shape of the hand changes more than a threshold of a pre-established distance or position over each certain time interval, the control unit 22 judges to have detected that change, after which a comparison is made with the above-described hand shape information. In this case, the control unit 22 makes the distance threshold larger, the longer is the distance indicated by the extracted three-dimensional face distance information. Doing this, unless the larger must be change the shape of the hand of the operator 13, the longer is the distance from the display device 10, the control unit 22 will not accept that change. By extension, with a lengthening of the distance from the display device 10, the operator 13 can be encouraged to make larger changes of the hand shape to input operations, thereby enabling a reduction in the influence of resolution of the imaging device 11.

The control unit 22 may make the distance threshold for detecting a change of hand shape with respect to an operator 13 in the young child age group smaller than with respect to other age groups. This enables pleasant operation of the display device 10 by even a young child whose hand size is not sufficiently developed. The control unit 22 may make the time interval for detection longer, the higher is the age group of the operator 13. This enables pleasant operation of the display device 10 by even an elderly person whose movements are sluggish.

By doing this, because the present embodiment changes processing of the display of a guidance image and of other operations for each characteristic information representing a characteristic of an operator, it can achieve pleasant operation regardless of the characteristics of the operator.

(Processing Flow)

Next, the data input processing related to the present embodiment will be described.

Figure 13:
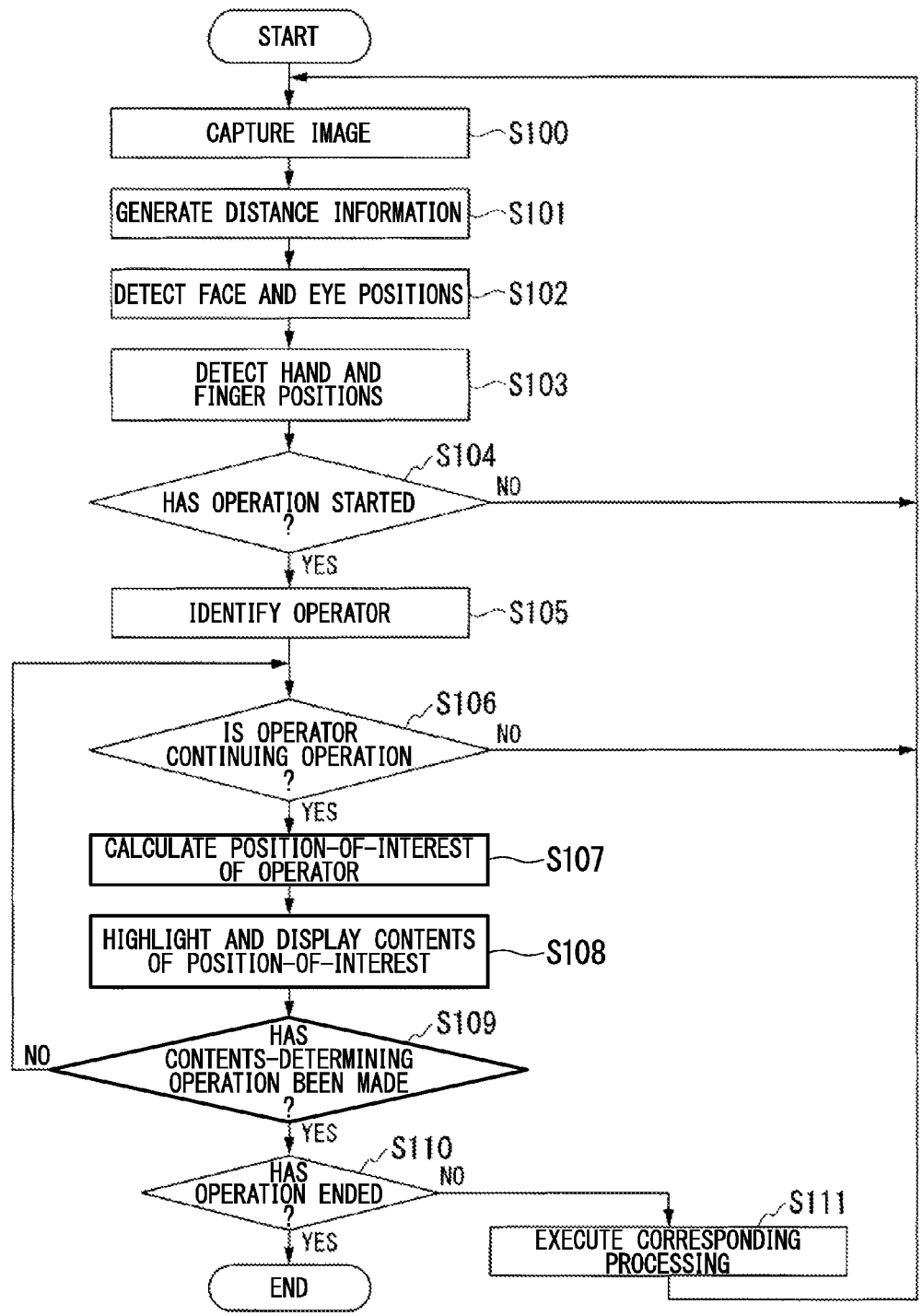
FIG. 13 is a flowchart showing the data input processing according to the above embodiment.

FIG. 13 is a flowchart showing the data input processing according to the present embodiment.

(Step S100) The imaging units 110a and 110b each capture an image and output the captured image signal to the distance calculation unit 200. The imaging unit 110a outputs an image signal to the face detection unit 30 and the hand position detection unit 32 of the user information analysis unit 201, after which processing proceeds to step S101.

(Step S101) The distance calculation unit 200, based on the image signals input from the imaging units 110a and 110b, respectively, calculates the distance from the imaging device 11 to the operator, for example, using the stereo matching method, and generates calculated distance information. The distance calculation unit 200 outputs the generated distance information to the face detection unit 30, the eye position detection unit 31, the hand position detection unit 32, and the hand shape/fingertip position detection unit 33 of the user information analysis unit 201, after which processing proceeds to step S102.

(Step S102) The face detection unit 30 detects a region representing a face image of an operator indicated by the image signal input from the imaging unit 110a. The face detection unit 30 generates two-dimensional face region information based on the detected face region. The face detection unit 30 extracts from the distance information input from the distance calculation unit 200 the distance value related to a two-dimensional pixel represented by two-dimensional face region information. The face detection unit 30 transforms the distance value corresponding to the above-described two-dimensional coordinates to three-dimensional coordinates in the subject space and generates three-dimensional face position information. The face detection unit 30 outputs a face image signal representing the detected face image to the characteristic information analysis unit 34 and the eye position detection unit 31. The face detection unit 30 outputs the generated three-dimensional face position information and the two-dimensional face region information to the operator distinguishing unit 35. The face detection unit 30 outputs the generated three-dimensional face position information to the detection information output unit 37 as part of the detection information.

The eye position detection unit 31 detects an eye region from the face image represented by the face image signal input from the face detection unit 30. The eye position detection unit 31 calculates eye position coordinates based on the detected eye region. The eye position detection unit 31 extracts a distance value of a pixel existing at the detected eye position coordinates from the distance information input from the distance calculation unit 200. The eye position detection unit 31 transforms the set of the calculated two-dimensional eye position coordinates and extracted distance values to three-dimensional eye position coordinates in the subject space and generates three-dimensional eye position information. The eye position detection unit 31 outputs three-dimensional eye position information representing the calculated three-dimensional eye position coordinates to the position-of-interest detection unit 36 and the operator distinguishing unit 35. The eye position detection unit 31 outputs an eye region signal representing the image of the detected eye region and two-dimensional eye position information representing the calculated two-dimensional eye position coordinates to the operator distinguishing unit 35, after which processing proceeds to step S103.

(Step S103) The hand position detection unit 32 detects a region representing a hand image of the operator represented by the image signal input from the imaging unit 110a and calculates two-dimensional coordinate values representing the detected hand position. The hand position detection unit 32 extracts a distance value corresponding to the calculated coordinates from the distance information input from the distance calculation unit 200, transforms the set of calculated two-dimensional coordinate values and the corresponding distance value to three-dimensional coordinates in the subject space, and generates three-dimensional hand position information. The hand position detection unit 32 outputs the hand image signal representing the detected hand region image and the hand position information representing the two-dimensional coordinate values of the calculated representative point to the hand shape/fingertip position detection unit 33. The hand position detection unit 32 outputs the hand position information to the operator distinguishing unit 35.

The hand shape/fingertip position detection unit 33 detects the hand shape based on the hand image signal and the hand position information input from the hand position detection unit 32. The hand shape/fingertip position detection unit 33 searches the finger region image based on the detected hand shape and counts the number of fingers. The hand shape/fingertip position detection unit 33 detects the fingertip positions of each finger as two-dimensional coordinates and extracts the distance value of a pixel existing at the detected two-dimensional coordinates from the distance information input from the distance calculation unit 200. The hand shape/fingertip position detection unit 33 generates three-dimensional fingertip position information that represents a set of extracted distance values and the two-dimensional coordinates in the fingertip as the three-dimensional coordinates in the subject space. The hand shape/fingertip position detection unit 33 outputs the generated three-dimensional fingertip position information to the position-of-interest detection unit 36. The hand shape/fingertip position detection unit 33 outputs as a part of the detection information to the detection information output unit 37 a finger image signal representing the detected finger region, count information representing the number of fingers, and the two-dimensional finger position information representing the two-dimensional coordinates of the fingertip, after which processing proceeds to step S104.

(Step S104) The operator distinguishing unit 35, based on the three-dimensional face position information input from the face detection unit 30, distinguishes as an operator from among users whose face regions have been detected a user existing in a pre-established operation-enabled region. The operator distinguishing unit 35, based on two-dimensional face region information input from the face detection unit 30 and two-dimensional eye position information input from the eye position detection unit 31, determines the operation start detection range. The operator distinguishing unit 35 judges whether an operator hand existing in the operation-enabled range is in the operation start detection range. Doing this, the operator distinguishing unit 35 detects that an operation from the operator has started. That is, the operator distinguishing unit 35, based on three-dimensional hand position information representing the position of the hand (part of the body) represented in an image captured by the imaging device 11, detects an operation range r1 (which is the same as the operation start detection range) in which a user can make an operation using a part of the body. If the judgment is that an operation has been started (Yes at step S104), processing proceeds to step S105. If the judgment is that an operation has not been started (No at step S104), processing returns to step S100.

In addition to the above-described operation start detection, the operator distinguishing unit 35 may, based on the three-dimensional eye position information and three-dimensional face region information representing three-dimensional coordinates in the subject space, determine the operation start detection range. In this case, the operator distinguishing unit 35 may distinguish whether there is an operator to accept an operation from, by judging whether or not the position of the hand in the subject space represented by the three-dimensional hand position information is included in the operation start detection region in the depth direction, (the operation start detection region (in the depth direction) starting from the operation start detection starting position (in the depth direction) in FIG. 8). This enables avoidance of faulty detection of the relationship between the operation start detection range and the hand position, by considering also the coordinates in the depth direction.

(Step S105) The operator distinguishing unit 35 tracks the operator's face and hand in the operation-enabled region and identifies the operator. That is, if the operation range r1 was able to be detected, the operator distinguishing unit 35 identifies the hand of the user having a hand represented by the three-dimensional hand position information as an operator. Stated differently, the operator distinguishing unit 35 identifies as users who cannot operate and who are other than a user identified as an operator. Doing this, the display device 10 does not track (recognize) the face and hand of other users, thereby enabling it to prevent faulty operation during operation by an identified operator caused by, for example, operation being stolen away by another person. After this, processing proceeds to step S106.

(Step S106) The operator distinguishing unit 35 judges whether or not the hand of an operator existing in the operation-enabled region is in the operation start detection range, and detects whether the operator is continuing operation. If the operator distinguishing unit 35 judges that the hand of the operator existing in the operation-enabled region exists in the operation start detection range and detects that the operator is continuing operation (Yes at step S106), processing proceeds to step S107. If the operator distinguishing unit 35 judges that the hand of the operator existing in the operation-enabled region is not in the operation start detection range (that the hand of the operator is outside the operation-enabled region) and detects that the operator has ended or interrupted operation (No at step S106), processing returns to step S100.

In addition to the above-described operation continuation detection, the display device 10 may detect whether or not an operator is continuing operation by judging whether or not the position of the hand in the subject space represented by the three-dimensional hand position information is included in the operation start detection range in the depth direction (the operation start detection region (in the depth direction) starting from the operation start detection starting position (in the depth direction) in FIG. 8). This enables avoidance of faulty detection of the operation continuation by the operator, by considering the relationship between the operation start detection range and the hand position and also the coordinates in the depth direction.

(Step S107) The position-of-interest detection unit 36, based on the three-dimensional eye position information input from the eye position detection unit 31 and the three-dimensional fingertip position information input from the hand shape/fingertip position detection unit 33, calculates the position-of-interest coordinate R11, after which processing proceeds to step S108.

(Step S108) The control unit 22 highlights and displays on the display unit 12 a representative image of contents corresponding to the detected position-of-interest coordinate R11. Doing this, the display device 10 can show the operator contents-of-interest to the operator and that has been selected by position-of-interest detection. After that, processing proceeds to step S109.

(Step S109) The control unit 22 judges whether or not the operator has determined to playback or execute contents-of-interest of the operator by a pre-established operation (such as an operation of pressing the hand in the direction of the display device 10, stopping a hand for a prescribed time or changing the shape of the hand). If the judgment is that contents have been decided (Yes at step S109), processing proceeds to step S110.

If the control unit 22 judges that the operator has not decided the contents (No at step S109), processing returns to step S106.

(Step S110) The control unit 22 judges whether or not the operation by the user has ended. If, for example, an operation is input indicating the turning off of power, the control unit 22 judges that the operation has ended. If the judgment is that the operation has not ended (No at step S110), processing proceeds to step S111. If the judgment is that operation has ended (Yes at step S110) data input processing ends.

(Step S111) The control unit 22 reads out the corresponding contents or program from the information database 21 with respect to the representative image of interest to the operator, and plays back the contents or execute the program. The result of the playback or execution is displayed on the display unit 12, after which processing returns to step S100.

In this manner, in the present embodiment the display device 10 acquires three-dimensional hand position information (first position information) representing the position of each user hand (part of the body) represented in an image captured by the imaging device 11. The display device 10, based on the acquired three-dimensional hand position information, detects the operating range r1 in which the user can make an operation using a part of the body, and if the operation range r1 could be detected, it identifies the user having a part of the body represented by the three-dimensional hand position information as an operator candidate. Then, the display device 10 identifies from the operator candidates a user having a part of the body included in the operation region as an operator and identifies users among the operator candidates other than a user identified as a an operator as users who cannot operate.

Doing this, the display device 10 can improve operability. For example, because the display device 10 detects the operation range r1, when a user moves, it can distinguish whether or not the movement was intended as the input of an operation or was a movement having a different intention. For example, because the display device 10 detects the operation range r1 to identify the operation, if a plurality of users are simultaneously viewing the image displayed on the image display device, it is possible to prevent the motion of one user from inputting an operation unintended by another user. Additionally, for example, if the display device 10 is being operated simultaneously by a plurality of users and the image display device accepts input of each operation, it is possible to prevent faulty operation caused by the instruction to perform processing with respect to conflicting operations that are input.

According to the present embodiment, the display device 10, based on a reference position coordinate P10 representing the position of the eye or face of an operator and a specified position coordinate P11 representing the position of a part of the operator's body (for example, the finger), calculates the position-of-interest coordinate R11 indicated by a part of the body of the operator located within operating panel P1 of the display region of the display device 10. This enables the display device 10 to move a pointer on the display in accordance with the position-of-interest to the user, thereby improving operability, even if the direction of the pointed finger and the direction of the line of view of the user are not parallel.

For example, the display device 10 can detect the position-of-interest of the operator and, even if the user is not accustomed to the method of operations directed to a large-scale screen, high-resolution display, the user can select the contents-of-interest, thereby enabling a reduction of user operational stress and improving the operability.

Second Embodiment

The second embodiment of the present invention will be described below, with references made to the drawings.

Figure 14:
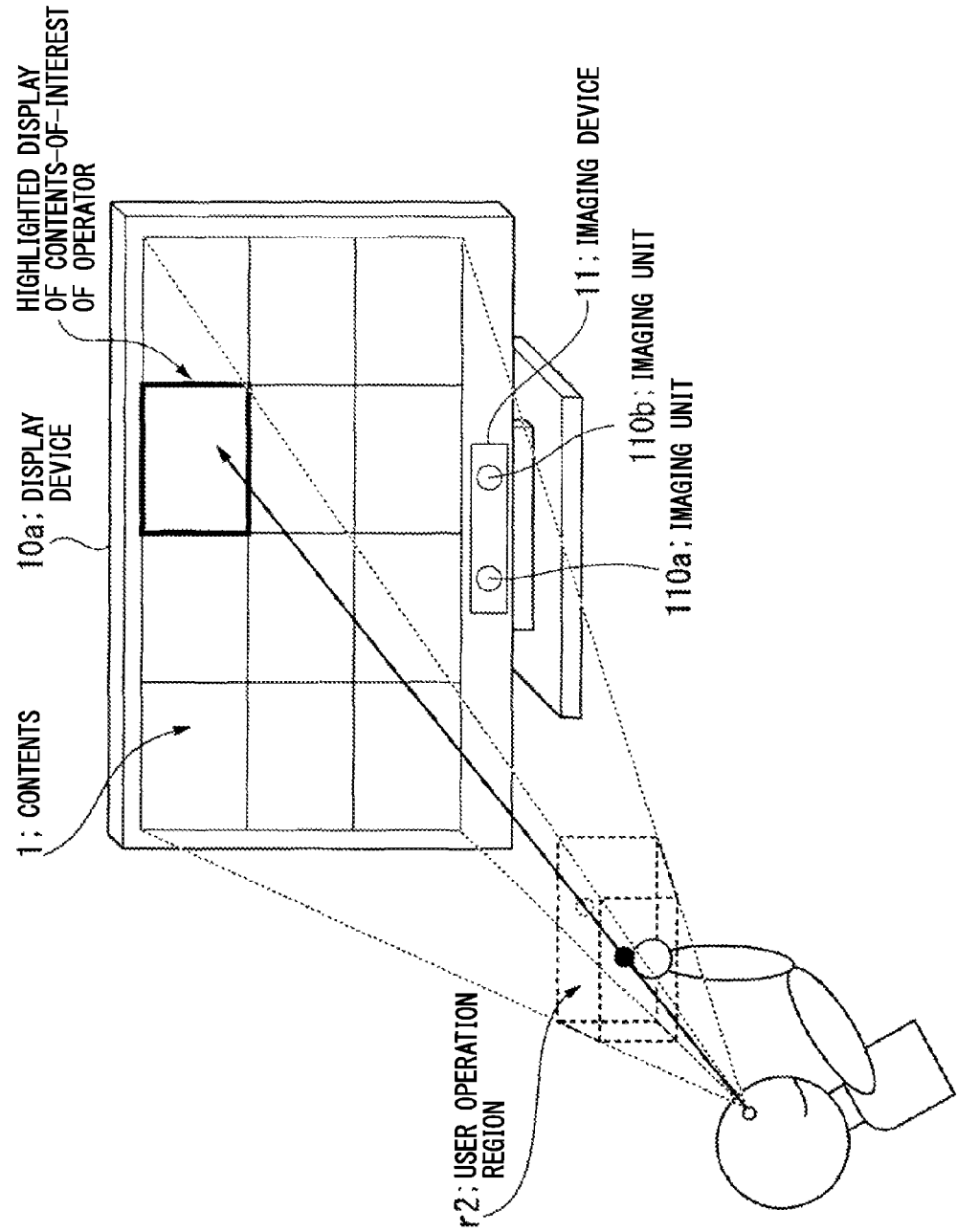
FIG. 14 is a simplified drawing for describing a display device according to a second embodiment of the present invention.

FIG. 14 is a simplified drawing for describing a display device 10a according to the second embodiment of the present invention. The display device 10a, based on operations by an operator, determines the operation region of the operator in accordance with the display region on the display unit 10a that is within the field of view of the operator.

In this drawing, the region r2 shown by broken lines is the user operation region r2. The user operation region r2 is the region in which an operator may make an operation with respect to the display device 10a. The display device 10a sets as the user operation region r2 a spatial region at a pre-established distance from the front of the face in accordance with a region established by the line of view of the operator from the eyes of the operator (reference position coordinate P10) passing through the edges of the display region of the display device 10a. In this case, because the user operation region r2 is along the line of view of the user, the shape is not a cubic, but rather is a shape swept by a plane parallel to the display device 10a that becomes gradually larger as it approaches the display device 10a (moves away from the operator) in the depth direction. The operator can make an operation by moving a hand within the user operation region r2.

The display device 10a makes a display that notifies the user of the contents selected by the operator by the operator pointing by the hand at the contents-of-interest from among a plurality of contents displayed on the display device 10a (4 horizontally×3 vertically, for a total of 12 contents). For example, as a notification display, the display device 10a surrounds the representative image of the selected contents by solid lines and makes a highlighted display of the position-of-interest. The method of presenting the position-of-interest of the operator to the operator is, however, not restricted to this and may be, for example, a method of presenting the position-of-interest to the operator by making a pointer display of the position-of-interest by the operator in units of pixels in the display region.

Next, the method of setting the user operation region r2 will be described, using FIG. 15.

Figure 15:
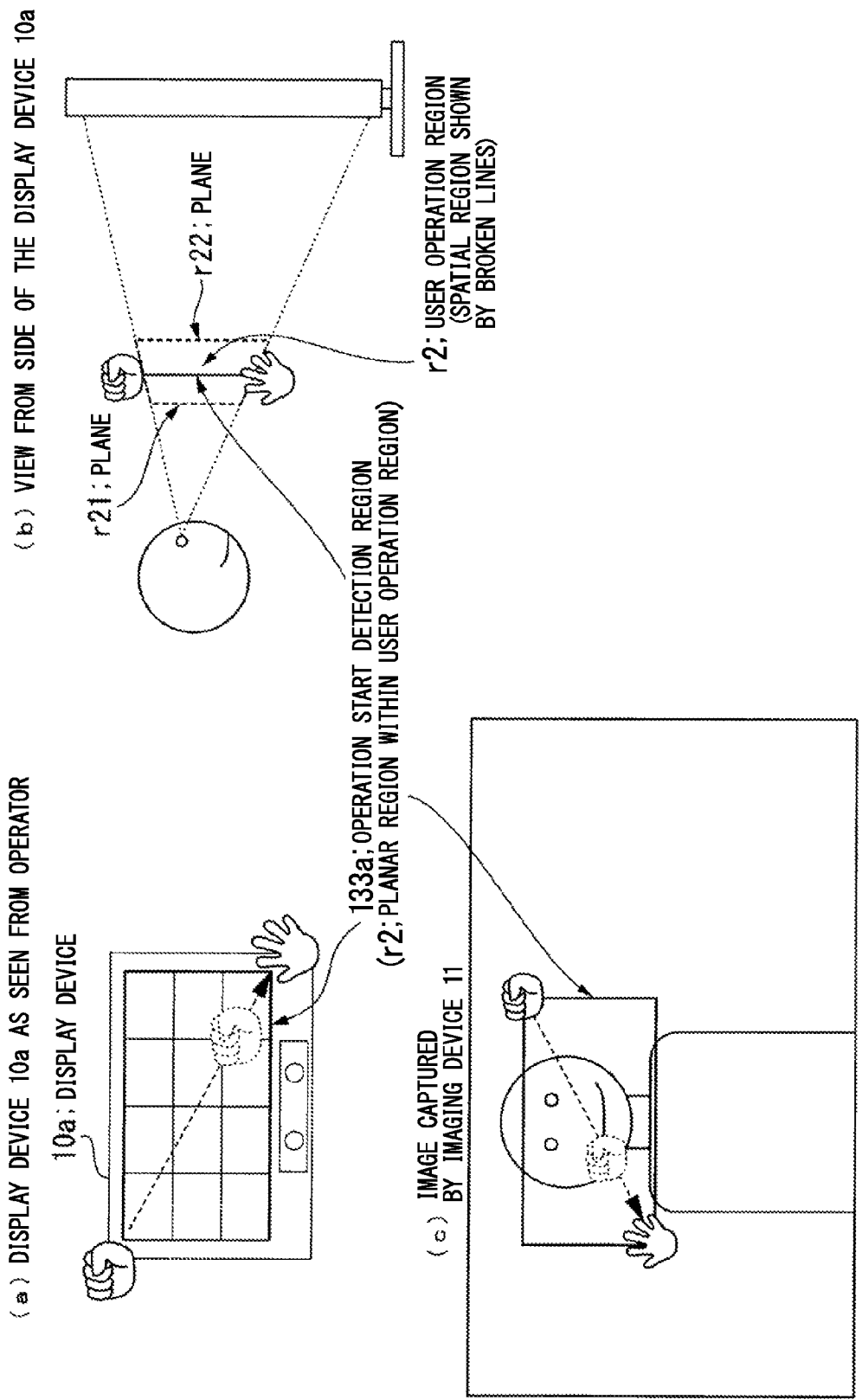
FIG. 15 is a simplified drawing for describing an example of the method of setting the user operation region.

FIG. 15 is a simplified drawing for describing an example of the method of setting the user operation region r2. FIG. 15(a) is a drawing showing the display device 10a as viewed from the operator, FIG. 15(b) is a side view of the operator and the display device 10a, and FIG. 15(c) is an image captured by the imaging device 11, using either of the imaging units 110a and 110b.

This drawing is an example of specifying a display region on the display device 10a as viewed from the user by the operations of closing and opening the hand. The user specifies the upper-left vertex of the display region as seen from the user by the motion of closing the hand. Then, keeping the hand in the same shape, the user moves it down to the lower-right along a diagonal line in the display region as seen from the user and opens the hand to specify the lower-right vertex. The display device 10a sets a region that has this diagonal and includes the rectangle specified by the closing and the opening of the hand as the operation start detection region 133a. The display device 10a recognizes the user who specifies this region as an operator.

The display device 10a sets the operation start detection region 133a and also sets the user operation region r2. For example, the display device 10a sets a spatial region that includes the plane of the operation start detection region 133a as the user operation region r2. Specifically, the display device 10a sets as the user operation region r2 a spatial region within a region established by the lines of view as seen by the eye of the operator (the reference position coordinate P10) that pass through the edges of the operation start detection region 133a. In this case, the display device 10a sets a region in the depth direction of the user operation region r2, based on the operation start detection region 133a. For example, referenced from the operation start detection region 133a, the display device 10a sets as the user operation region r2 a region from the plane r21 on the operator side by a pre-established depth amount up to the plane r22 on the display device 10a side by a pre-established depth amount. That is, the display device 10a detects the user operation region r2 by pre-established operations specified by the user. Specifically, the display device 10a detects the user operation region r2 by the user specifying the upper-left vertex (first vertex) of the display region on the display device 10a within the field of view of the user and the lower-right vertex (second vertex) that is diagonally opposite to the first vertex. The first and second vertices may be the upper-right and lower-left vertices, respectively.

The user operation region r2 is a spatial region shaped by a plane parallel to the display device 10a gradually increasing in size with movement toward the display device 10a. That is, the user operation region r2 broadens with movement toward the display device 10a from the operator. The display device 10a recognizes as an operation a change of the shape of the hand or movement of the hand within the user operation region r2. In contrast, if the hand moves out of the user operation region r2, the display device 10a does not recognize an operation.

The display device 10a transforms the user operation region r2 in the three-dimensional space to a two-dimensional planar region (operation start detection region 133a) on an image captured by the imaging device 11, and takes this as being the two-dimensional user operation region r23 of the operator. That is, the display device 10a takes the operation start detection region 133a as the user operation region r23. An operation by an operator is detected by the movement and shape of a hand in the two-dimensional user operation region r23. In this manner, the display device 10a transforms the user operation region r2 in a three-dimensional space set by an operation start instruction to the two-dimensional user operation region r23 as a rectangular region that is specified by the motions of closing and opening the hand captured on the imaging device 11 (region of the user operation region r2 represented in the three-dimensional space shown in FIG. 15(c) expressed by a two-dimensional plane on the captured image). This enables the display device 10a to allocate the display region size and shape viewed by the operator as the user operation region r2 regardless of the height of the operator, a distance from the display device 10a to the operator and location thereof. This enables the operator to operate (to instruct) the display device 10a with a more natural hand position.

Next, contents selection will be described, using FIG. 16.

Figure 16:
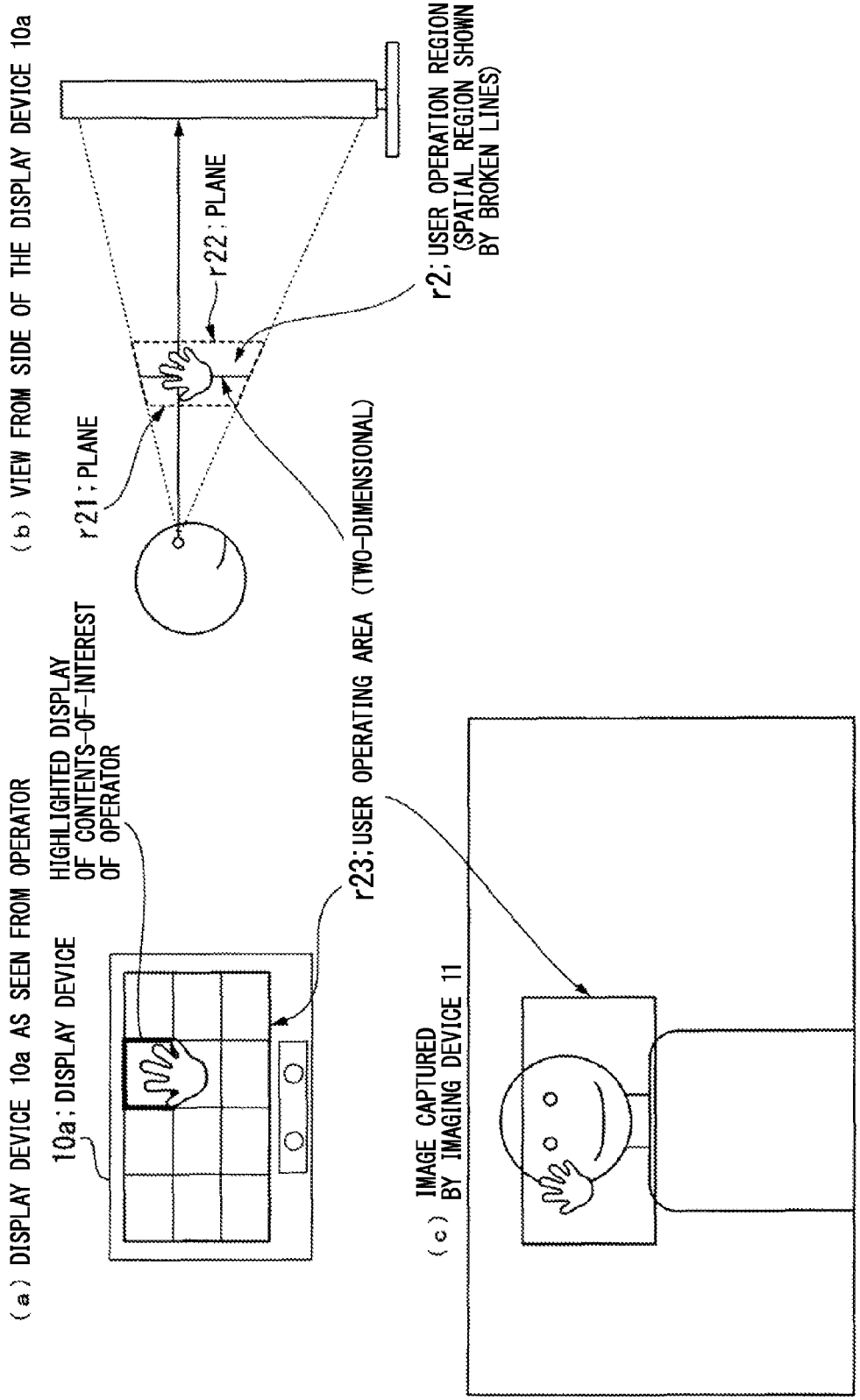
FIG. 16 is a conceptual drawing showing an example of contents selection.

FIG. 16 is a conceptual drawing showing an example of contents selection. This example is for a case in which the position-of-interest is detected and the contents is selected by the movement of the hand position. FIG. 16(a) shows the display device 10a as viewed from the operator, FIG. 16(b) shows the operator and the display device 10a as viewed from the side, and FIG. 16(c) is an image captured by the imaging device 11, using either of the imaging units 110a and 110b.

In this drawing, the display device 10a detects the (selected) contents-of-interest of the operator from the position of the hand in the user operation region r2 set by the operation start detection region 133a. This enables the operator to select contents by pointing to the contents-of-interest in the display region within the field of view. When using a mouse pointer on a personal computer, the operator can move the mouse pointer to track the hand that is moved in the display region within the field of view of the operator.

Specifically, the display device 10a takes as the position-of-interest the position on the display region corresponding to the position of the hand on the user operation region r23 determined by the above-noted operation start detection operation. That is, the display device 10a scales the coordinates of the hand position on the region represented in a two-dimensional plane in the captured image by the expansion or reduction ratio when the size of a region represented on a two-dimensional plane (user operation region r23) in the captured image is scaled to the display region size. By doing this, the display device 10a calculates the coordinates in the display region of the contents-of-interest of the operator. In this manner, the display device 10a transforms the position of the hand in the user operation region r2 to a position-of-interest or pointer position in the display region.

This enables the display device 10a to set the optimum user operation region r2, in accordance with the viewing position of the operator. As a result, the display device 10a can, without regard to the body characteristics or viewing position of the operator, take the position-of-interest to the operator as is to be the selected contents. The display device 10a performing contents selection processing based on the two-dimensional user operation region r23 can reduce the processing load, compared with contents selection processing based on the three-dimensional user operation region r2. The display device 10a measures the hand position in the depth direction only when the hand position is within the user operation region r2 in the three-dimensional space, and may not measure the hand position in the depth direction when the hand position is outside of the user operation region r2.

The determination (playback) of contents selected by the operator is done by operations such as stopping the hand for a certain period of time, making a grabbing motion (or moving the closed hand forward from the operator), moving (pushing) the hand in the depth direction, aiming the palm or fingers toward the operator and moving the hand forward (or moving it repeatedly forward and in the depth direction a plurality of times), or making a vocal utterance with a pre-established meaning (such as decide, select, this, playback, or want to see). The control unit 22 plays back and displays on the display unit 12 the contents selected and determined by the operator.

Although the user operation region r23 described up until this point has been a two-dimensional planar region within the user operation region r2 in a three-dimensional space, it is not restricted to this and, as long as the user operation region r23 is within the user operation region r2 in a three-dimensional space, rather than being a two-dimensional plane, it may be a three-dimensional solid shape (such as a cube). This enables operation detection even if the operator's hand is operated up-down and left-right in the display plane of the display device 10a the operator's hand moves in the depth direction. The operation by the operator can thus be detected and robustness of the operation detection is improved, even when detecting an operation using depth-direction movement of the hand or the hand moving (shifting) in the depth direction.

Next, if a plurality of operators are in an image captured by the imaging device 11, the display device 10a distinguishes as the operator a user who has performed an operation by the method of setting the user operation region r2 as described above, and detects the hand in the user operation region r2 set by the distinguished operator. For example, the display device 10a does not detect the movement of the hand of a user other than the distinguished operator. Because the display device 10a can exclusively distinguish the operator, this enables the prevention of faulty operation caused by movement of a hand other than that of the operator and the occurrence of contention between operations by a plurality of users.

The display device 10a judges the condition in which there is no operator, and again performs processing to detect an operator. For example, if the operator, for example, removes the hand from the user operation region r2 for a certain period of time, or if makes a pre-established gesture to end operation, the display device 10a judges that there is no operator. From the above, once an operator is distinguished, operation is possible by only the distinguished operator until the operation is ended. When the operation by the distinguished operator ends, the next user setting the user operation region is distinguished as an operator and can make operations.

(Display Device Constitution)

Next, the constitution of the display device 10a according to the present embodiment will be described. Comparing the display device 10a according to the present embodiment with the display device 10 (refer to FIG. 3), the display device 10a differs by having a user information analysis unit 201a in place of the user information analysis unit 201. However, the functions of other constituent elements are the same as in the display device 10.

Figure 17:
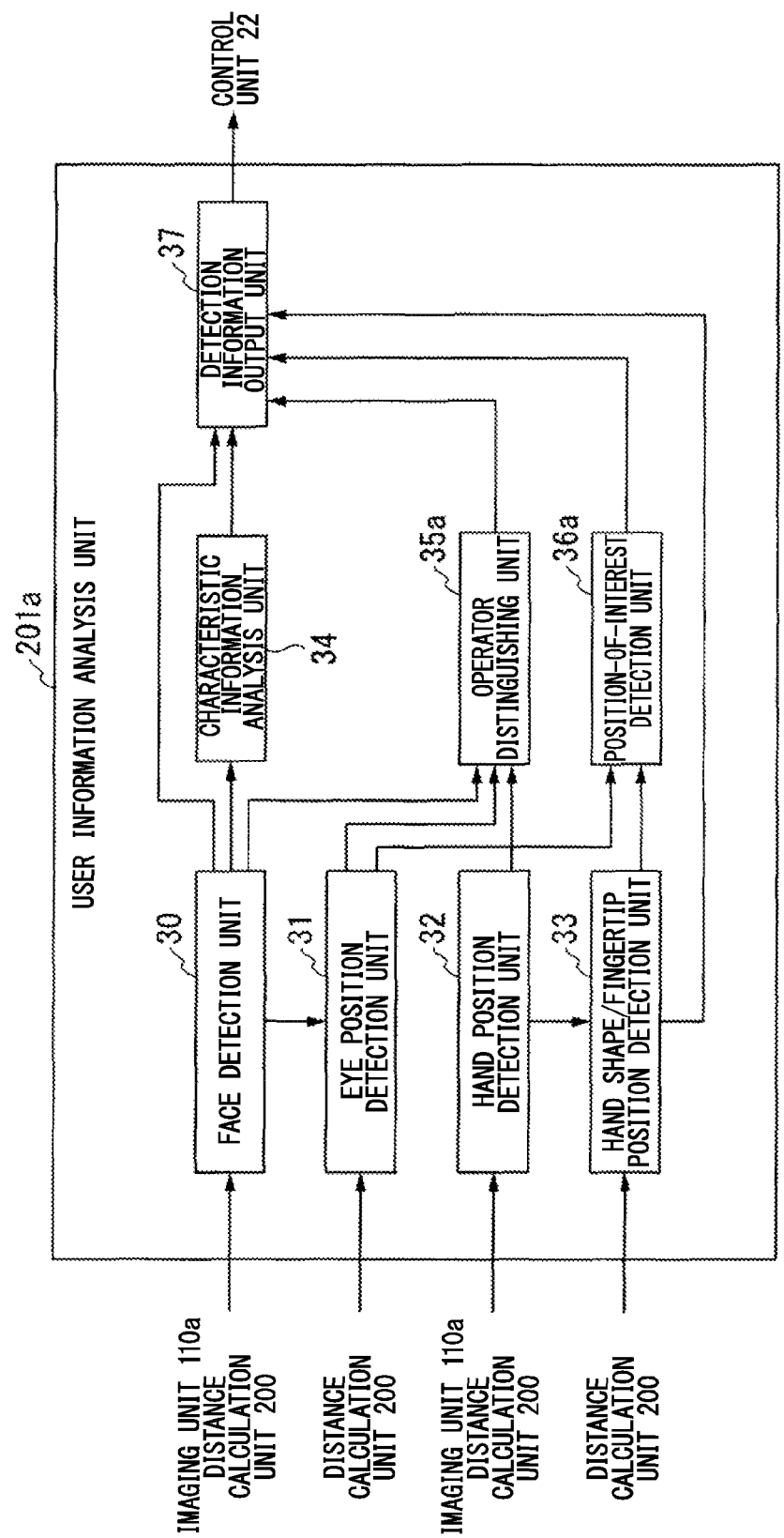
FIG. 17 is a block diagram showing the constitution of a user information analysis unit according to the second embodiment.

FIG. 17 is a block diagram showing the constitution of the user information analysis unit 201a according to the present embodiment. The user information analysis unit 201a (FIG. 17) according to the present embodiment, compared with the user information analysis unit 201 (FIG. 7) differs by having an operator distinguishing unit 35a and a point-of-interest detection unit 36a. However, the functions of the other constituent elements are the same as in the user information analysis unit 201.

The operator distinguishing unit 35a and the position-of-interest detection unit 36a perform the following processing.

(Processing Flow)

Next, the data input processing according to the present embodiment will be described.

Figure 18:
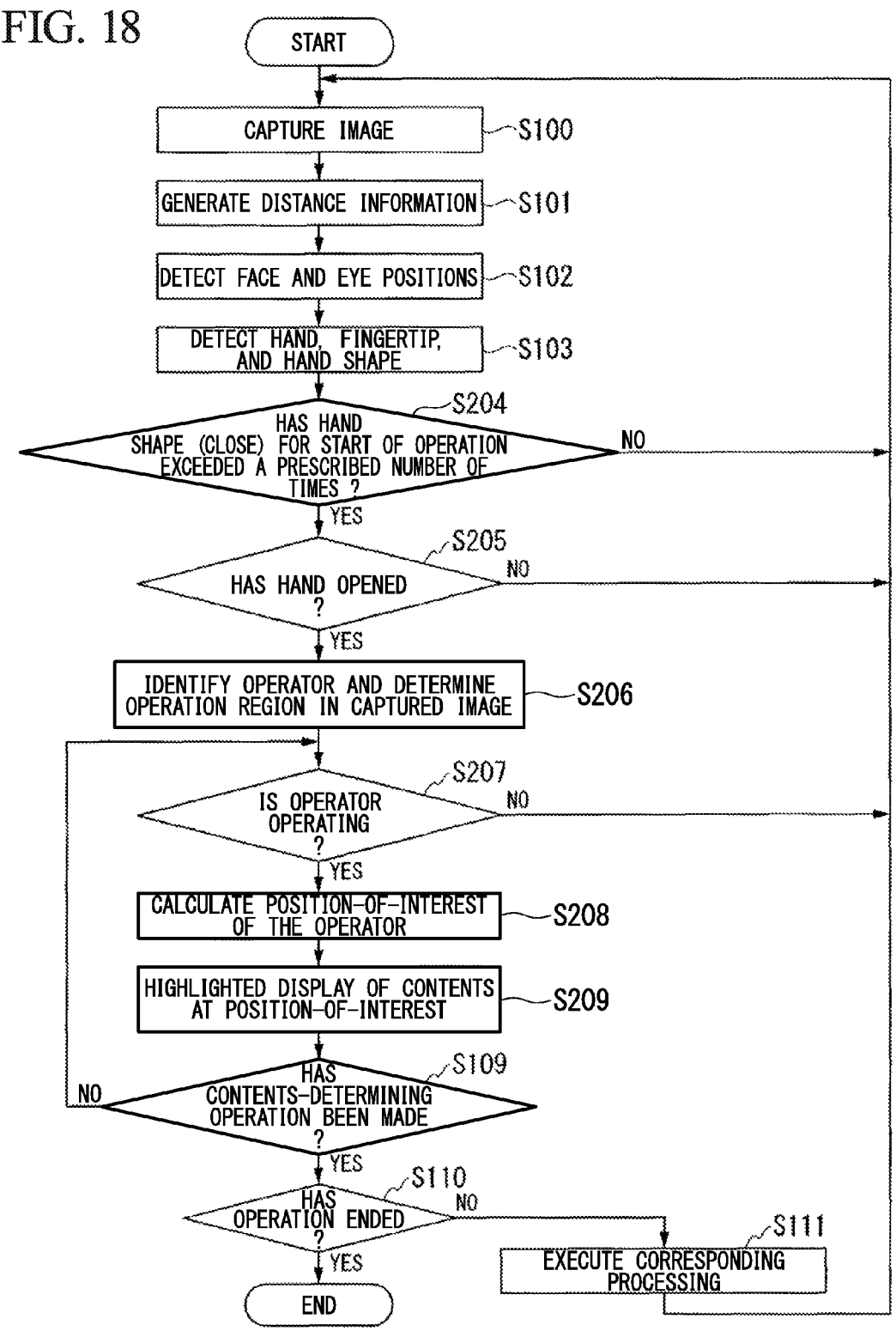
FIG. 18 is a flowchart showing the data input processing according to the second embodiment.

FIG. 18 is a flowchart showing the data input processing according to the present embodiment. Comparing the data input processing according to the present embodiment (FIG. 18) with the data input processing according to the first embodiment (FIG. 13), the difference is that the processing of steps S204 to S209 is performed in place of the processing of steps S104 to S108. However, in the processing of FIG. 18, processings to which the same reference symbols have been applied are the same as processings in FIG. 13.

(Step S204) The operator distinguishing unit 35a, based on three-dimensional face position information input from the face detection unit 30, distinguishes users whose face regions have been detected. If the shape of the hand of a distinguished user is the operation start shape (for example, closed), the operating distinguishing unit 35a increments the count thereof. The operator distinguishing unit 35a judges, with regard to the distinguished users, whether the operation start hand shapes have exceeded a prescribed number. If the operation start hand shapes have exceeded the prescribed number (Yes at step S204), processing proceeds to step S205. If the operation start hand shapes do not exceed the prescribed number (No at step S204), processing returns to step S200. If there was no operation start hand shape, the operator distinguishing unit 35a resets the number of times thereof. If the hand shape of a distinguished user is the operation start hand shape and the judgment is made that the hand shape is maintained for a prescribed amount of time, the operator distinguishing unit 35a may perform the processing of step S205.

(Step S205) The operator distinguishing unit 35a judges whether or not the hand shape of a user whose face region had been detected is the operation start detection end hand shape (for example, opened). If the shape becomes the operation start detection end shape (for example, opened) (Yes at step S205), processing proceeds to step S206. When this occurs, the operator distinguishing unit 35a sets the operation start detection region 133a, based on the position of the hand at the time of the operation start hand shape and the position of the hand at the time of the hand shape at the end of the operation start detection (refer to FIG. 15). If the hand shape was not the operation start detection end shape (for example, opened) (No at step S205), there being no operator, processing returns to step S200.

(Step S206) The operator distinguishing unit 35a identifies as an operator a user who has set the operation start detection region 133a at step S205. The operator distinguishing unit 35a identifies the operator and does not track (recognize) the faces and hands of other users. In the display device 10a, this prevents, for example, operation being stolen away from an identified operator by another user while that operator is operating.

The operator distinguishing unit 35a calculates the user operation region r2 that includes the operation start detection region 133a. By transforming the user operation region r2 to the user operation region r23 represented in a two-dimensional plane on the image captured by the imaging device 11, the operator distinguishing unit 35a establishes the operation region on the captured image. After that, processing proceeds to step S207.

(Step S207) The operator distinguishing unit 35a judges whether or not the hand of the operator is located within the range of the user operation region r2 and detects whether or not the user is continuing operation. If the operator distinguishing unit 35a judges that the user's hand located in the operation-enabled region (refer to FIG. 1) is located in the user operation region r2 and detects that the operator is continuing operation (Yes at step S207), processing proceeds to step S208. If the operator distinguishing unit 35a judges that the user's hand located in the operation-enabled region is not located in the user operation region r2 (or that the user's hand is outside the user operation region r2) and detects that the operator has ended or interrupted operation (No at step S207), processing returns to step S200.

In addition to the above-described operation continuation detection, the operator distinguishing unit 35a may judge whether or not the position of the hand in the subject space represented by the three-dimensional hand position information is included in the operation start detection range in the depth direction (the operation start detection region (depth direction) starting from the operation start detection starting position (depth direction) in FIG. 8) and may detect whether or not the operator is continuing operation. This enables the display device 10a to avoid faulty detection of the operation continuation detection of the operator, by considering also the coordinates in the depth direction with respect to the relationship between the operation start detection range and the hand position.

(Step S208) The point-of-interest detection unit 36a scales the size of the user operation region r23 to the display region size and calculates, as the position-of-interest, two-dimensional coordinates in which the position of the hand in the region represented by the user operation region r23 is associated with the display region, after which processing proceeds to step S209.

(Step S209) The control unit 22 highlights and displays on the display unit 12 a representative image in order to indicate to the operator the representative image of the contents corresponding to the detected position-of-interest, after which processing proceeds to step S110.

In this manner, according to the present embodiment, the display device 10a detects the user operation region r2 by a prescribed operation specified by a user. If the user operation region r2 could be detected, the display device 10a identifies a user having a part of the body represented by the first position information as the operator. This enables the display device 10a to improve the operability.

Also, according to the present embodiment, the display device 10a, based on the position of the eye or the face of the operator and the display region (operated region) of the display device 10a, detects the user operation region r2. The user operation region r2 broadens moving from the operator toward the display device 10a. For example, the user operation region r2 is a shape swept by a plane parallel to the display device 10a that becomes gradually larger as it approaches the display device 10a. For this reason, if a large-scale display or tiled display is used, when a pushing operation, which is a contents-determining operation, is made, rather than a motion of pushing the hand in a direction perpendicular to the display region plane of the display device 10a, the motion is pressing from the operator in the direction toward the contents on the display region.

In this manner, using the display device 10a, because the operator can make a motion of pushing toward the representative image, for example, of contents on the edge of the display region, it is possible to play back contents or to execute programs with a more intuitive motion. A tiled display is one in which a plurality of displays are combined to form a large display region.

As detecting the position-of-interest in the display device 10a, the point of intersection between a straight line joining the positions of the operator eye and the hand with the display device 10a is taken as the position-of-interest coordinates. With the display device 10a, the field of view of an operator corresponding to the display region is set as the user operation region r2, and the operator position-of-interest is detected, in association with the display region of the display device 10a, with a plane in the user operation region r2 as the operation region. This enables the display device 10a to determine the user operation region r when the user operation start is detected, thereby enabling determination of the user operation region r to suit the body characteristics of the operator. Therefore, because the user operation region r is determined without regard to individual differences in the body characteristics of users, in addition to an improvement in the accuracy of detecting the point-of-interest of the operator, it is possible to perform operations as intended with natural operations.

Although in the above-described embodiments the display devices 10 and 10a acquired distance information representing the distance up to the body of the operator, based on image signals input from the two imaging units 110a and 110b respectively, these embodiments are not restricted to that. For example, either of the imaging units 110a and 110b may be replaced by a rangefinding unit that acquires information of the distance to the subject by a different method, in which case, the distance information acquired by the rangefinding unit may be input to the user information analysis unit 201.

The rangefinding unit uses, for example, the TOF (time of flight) method as the method of acquiring distance information. In the TOF method, an LED (light-emitting diode), for example, is used as a light source, and the amount of time required for arrival from the emission of a light ray until it is reflected from the subject and the reflected light is received is measured. Dividing the measurement of the amount of time required for arrival into pre-established regions enables acquisition of distance information for each planar position within the subject space. The light source is, for example, an infrared light-emitting diode that emits invisible infrared invisible to the human eye, but is not restricted to this. For example, by using pulsed emission, the light source may be a laser light source. Also, by providing a phase modulator capable of modulating the amplitude or phase of the light ray, the arrival time may be calculated based on the phase difference between the emitted light and the reflected light.

In the above, although the description has been for the example in which the control unit 22 performed a type of processing with respect to hand shape information as the detection information input from the user information analysis unit, the embodiments are not restricted to this. In these embodiments, the part of the body used is not restricted to being the hand, and can be user information of other parts, such as the shape of an arm, the neck, the head, or the torso. The shape in the user information is not restricted to a stationary shape, and may include movement, which is a change of shape with time, or attitude. The user information used may be three-dimensional position information in place of two-dimensional position information.

In this manner, according to the embodiments, first position information representing the position of a part of the body for each user represented in an image captured by the imaging device 11 is acquired. According to the embodiments, users are distinguished based on the first position information, user information including information representing the shape of a part of the body of users represented in an image captured by the imaging device 11 is detected, and processing is performed with respect to the detected user information. For this reason, even if a plurality of operators change their bodies in an attempt to make an operation, pleasant operation is possible, without contention of processing with respect to a plurality of simultaneous operations.

According to the embodiments, the existence or non-existence of a guidance image display and characteristic information representing characteristics of users based on an image captured by an imaging device are estimated by the timing at which execution of processing with respect to user information was done, and guidance images with different display forms are displayed, depending upon the characteristic information. This enables pleasant operation, accommodating users with diverse characteristics.

A part of the display devices 10 and 10a in the above-described embodiments, for example, the distance calculation unit 200, the face detection unit 30, the eye position detection unit 31, the hand position detection unit 32, the hand shape/fingertip position detection unit 33, the characteristic information analysis unit 34, the operator distinguishing units 35 and 35a, the point-of-interest detection units 36 and 36a, the detection information output unit 37, and the control unit 22 may be implemented by a computer. In this case, a program implementing these control functions may be recorded on a computer-readable recording medium, and a computer system may read and execute the program recorded on the recording medium. The term "computer system" is a computer system built into the display device 10 and includes an operating system and hardware such as peripheral devices. The term "computer-readable recording medium" refers to a portable medium, such as a flexible disk, an optical-magnetic disc, a ROM, and a CD-ROM, and a storage device, such as a hard disk that is built into a computer system. The term "computer-readable recording medium" may further include one that retains a program dynamically for a short period of time, such as a communication line when a program is transmitted via a communication circuit such as a network like the Internet or a telephone circuit, in which case it may hold a program for a certain period of time, such as a volatile memory within a computer system serving as a server or client. The above-noted program may have the object of implementing a part of the above-described functions, and it may also implement the above-described function in combination with a program already stored in a computer system.

A part or all of the display device 10 in the above-described embodiments may be implemented by an integrated circuit such as an LSI (large-scale integration) device. Each functional block of the display device 10 may be made into individual processors, and a part or all thereof may be integrated into a processor. The method of integrated circuit implementation is not limited to LSI and may be implementation by a dedicated circuit or by a general-purpose processor. Additionally, in the event that integrated circuit implementation technology that replaces LSI appears as a result of technological advancement in semiconductors, an integrated circuit using that technology may be used.

Although the above has been a detailed description of embodiments of the present invention, with reference made to the drawings, the specific constitution is not restricted to the above, and may be subject to various design changes and the like within the scope of the contents of the invention.

REFERENCE SYMBOLS 10, 10a Display device
2a Data input device
11 Imaging device
20 Image processing device
200 Distance calculation unit
201, 201a User information analysis unit
30 Face detection unit
31 Eye position detection unit
32 Hand position detection unit
33 Hand shape/fingertip position detection unit
34 Characteristics information analysis unit
35, 35a Operator distinguishing unit
36, 36a Point-of-interest detection unit
37 Detection information output unit
2b Display control device
12 Display unit
21 Information database
22 Control unit

The invention claimed is:

1. A position-of-interest detection device comprising:
first and second imaging units configured to capture an image;
a position detection unit configured to acquire a three-dimensional position of a part of a body of a user indicated in the image captured by the first and second imaging devices; and
a user information analysis unit configured to detect a three-dimensional operation region where the user can operate by using the part of the body, the detection of the three-dimensional operation region being performed based on first and second vertexes specified by the user, the second vertex being diagonally opposite the first vertex, the three-dimensional operation region being included in a three-dimensional region, the three-dimensional region being established by lines of view of the user from eyes of the user, the lines of view passing through edges of a display region of a display device, the three-dimensional operation region broadening from the user toward the display device,
wherein the user information analysis unit is configured to identify the user including the part of the body in a case that the three-dimensional position is included in the three-dimensional operation region.

2. The position-of-interest detection device according to claim 1,
wherein, in the case that the three-dimensional position is included in the three-dimensional operation region, the user information analysis unit is configured to detect user information that includes information indicating a shape of the part of the body of the user, the position-of-interest detection device further comprising a control unit configured to execute processing corresponding the user information detected by the user information analysis unit.

3. The position-of-interest detection device according to claim 2,
wherein the position-of-interest detection device further comprises a position-of-interest detection unit configured to associate a size of the three-dimensional operation region detected by the user information analysis unit in a case that the user is viewed from the display device with a size of an operated region in the display region and calculate, based on the association, a corresponding position within an operated region from the three-dimensional position within the three-dimensional operation region.

4. The position-of-interest detection device according to claim 1,
wherein the position-of-interest detection device further comprises a position-of-interest detection unit configured to associate a size of the three-dimensional operation region detected by the user information analysis unit in a case that the user is viewed from the display device with a size of an operated region in the display region and calculate, based on the association, a corresponding position within an operated region from the three-dimensional position within the three-dimensional operation region.

5. The position-of-interest detection device according to claim 4, wherein the position detection unit is configured to use, as the part of the body, a hand.

6. The position-of-interest detection device according to claim 1,
the position-of-interest detection device further comprises a display unit configured to display the image captured by the first and second imaging devices, and
the first and second imaging devices are installed at positions higher than that of the display unit.

7. The position-of-interest detection device according to claim 6,
wherein the position-of-interest detection device further comprises a position-of-interest detection unit configured to associate a size of the three-dimensional operation region detected by the user information analysis unit in a case that the user is viewed from the display device with a size of an operated region in the display region and calculate, based on the association, a corresponding position within an operated region from the three-dimensional position within the three-dimensional operation region.

8. The position-of-interest detection device according to claim 6,
wherein, in the case that the three-dimensional position is included in the three-dimensional operation region, the user information analysis unit is configured to detect user information that includes information indicating a shape of the part of the body of the user, the position-of-interest detection device further comprising a control unit configured to execute processing corresponding the user information detected by the user information analysis unit.

9. The position-of-interest detection device according to claim 1, further comprises a position-of-interest detection unit configured to calculate a position indicated by the part of the body of the operator that is a position within an operated region in the display region, based on reference position information representing a position of at least one of an eye and a face of the operator and instruction position information indicating a position of the part of the body of the operator.

10. The position-of-interest detection device according to claim 9,
wherein, in the case that the three-dimensional position is included in the three-dimensional operation region, the user information analysis unit is configured to detect user information that includes information indicating a shape of the part of the body of the user, the position-of-interest detection device further comprising a control unit configured to execute processing corresponding the user information detected by the user information analysis unit.

11. The position-of-interest detection device according to claim 9,
wherein the position-of-interest detection device further comprises a position-of-interest detection unit configured to associate a size of the three-dimensional operation region detected by the user information analysis unit in a case that the user is viewed from the display device with a size of an operated region in the display region and calculate, based on the association, a corresponding position within an operated region from the three-dimensional position within the three-dimensional operation region.

12. The position-of-interest detection device according to claim 1,
wherein the user information analysis unit is configured to identify as at least one user who cannot perform operation at least one user other than the user identified as the operator.

13. The position-of-interest detection device according to claim 12,
wherein, in the case that the three-dimensional position is included in the three-dimensional operation region, the user information analysis unit is configured to detect user information that includes information indicating a shape of the part of the body of the user, the position-of-interest detection device further comprising a control unit configured to execute processing corresponding the user information detected by the user information analysis unit.

14. The position-of-interest detection device according to claim 1,
wherein a shape of the three-dimensional operation region is a truncated pyramid.

15. The position-of-interest detection device according to claim 1,
wherein the user information analysis unit is configured to:
use, as the first vertex, a first position where the part of the body became a first shape; and use, as the second vertex, a second position where the part of the body became a second shape from the first shape, the second shape being different from the first shape.

16. A position-of-interest detection method comprising:
acquiring a three-dimensional position of a part of a body of a user indicated in an image captured by a first and second imaging devices; and
detecting a three-dimensional operation region where the user can operate by using the part of the body, the detection of the three-dimensional operation region being performed based on first and second vertexes specified by the user, the second vertex being diagonally opposite the first vertex, the three-dimensional operation region being included in a three-dimensional region, the three-dimensional region being established by lines of view of the user from eyes of the user, the lines of view passing through edges of a display region of a display device, the three-dimensional operation region broadening from the user toward the display device; and
identifying as an operator the user including the part of the body in a case that the three-dimensional position included in the three-dimensional operation region.

17. A non-transitory computer readable recording medium storing a position-of-interest detection program executing:
acquiring a three-dimensional position of a part of a body of a user indicated in an image captured by first and second imaging devices; and
detecting a three-dimensional operation region where the user can operate by using the part of the body, the detection of the three-dimensional operation region being performed based on first and second vertexes specified by the user, the second vertex being diagonally opposite the first vertex, the three-dimensional operation region being included in a three-dimensional region the three-dimensional region being established by lines of view of the user from eyes of the user, the lines of view passing through edges of a display region of a display device, the three-dimensional operation region broadening from the user toward the display device; and
identifying as an operator the user including the part of the body in a case that the three-dimensional position is included in the three-dimensional operation region.

* * * * *